US011269131B2

(12) United States Patent
Peng et al.

(10) Patent No.: US 11,269,131 B2
(45) Date of Patent: Mar. 8, 2022

(54) LIQUID CRYSTAL REFLECTIVE POLARIZER AND PANCAKE LENS ASSEMBLY HAVING THE SAME

(71) Applicant: Facebook Technologies, LLC, Menlo Park, CA (US)

(72) Inventors: Fenglin Peng, Redmond, WA (US); Junren Wang, Redmond, WA (US); Yuge Huang, Redmond, WA (US); Lu Lu, Kirkland, WA (US); Yusufu Njoni Bamaxam Sulai, Snohomish, WA (US); Ying Geng, Bellevue, WA (US); Jacques Gollier, Sammamish, WA (US); Barry David Silverstein, Kirkland, WA (US); Yu-Jen Wang, Menlo Park, CA (US); Yun-Han Lee, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/820,695

(22) Filed: Mar. 16, 2020

(65) Prior Publication Data
US 2021/0286124 A1    Sep. 16, 2021

(51) Int. Cl.
*F21V 8/00*           (2006.01)
*G02F 1/13363*        (2006.01)
(Continued)

(52) U.S. Cl.
CPC .......... *G02B 6/0056* (2013.01); *G02B 5/3016* (2013.01); *G02B 5/3083* (2013.01);
(Continued)

(58) Field of Classification Search
CPC .. G02B 6/0056; G02B 5/3016; G02B 5/3083; G02F 1/133638; G02F 1/133543;
(Continued)

(56) References Cited

U.S. PATENT DOCUMENTS 5,627,666 A * 5/1997 Sharp .................. G02B 5/3016
349/171
5,731,886 A    3/1998 Taber et al.
(Continued)

FOREIGN PATENT DOCUMENTS

JP    2014174468 A    9/2014

OTHER PUBLICATIONS

Paterson D. A., et al., "Understanding the twist bend nematic phase: the characterisation of 1-(4 cyanobiphenyl-4'-yloxy)-6-(4-cyanobiphenyl-r'-yl)hexane (CB60CB) and comparison with CB7CB," Soft Matter, 2016,12, pp. 6827-6840 (14 pages).
(Continued)

*Primary Examiner* — Nathanael R Briggs
(74) *Attorney, Agent, or Firm* — Millburn IP PLLC

(57) ABSTRACT

An optical device is provided. The optical device includes a first optical element configured to output an elliptically polarized light having one or more predetermined polarization ellipse parameters. The optical device also includes a second optical element including a birefringent material with a chirality, and configured to receive the elliptically polarized light from the first optical element and reflect the elliptically polarized light as a circularly polarized light.

17 Claims, 18 Drawing Sheets

(51) Int. Cl.
*G02F 1/1335* (2006.01)
*G02B 5/30* (2006.01)
*G02F 1/13357* (2006.01)

(52) U.S. Cl.
CPC .... *G02F 1/13362* (2013.01); *G02F 1/133536* (2013.01); *G02F 1/133541* (2021.01); *G02F 1/133543* (2021.01); *G02F 1/133636* (2013.01); *G02F 1/133638* (2021.01); *G02F 1/133615* (2013.01); *G02F 2201/343* (2013.01); *G02F 2413/02* (2013.01); *G02F 2413/13* (2013.01)

(58) Field of Classification Search
CPC ......... G02F 1/133541; G02F 1/133536; G02F 1/13362; G02F 1/133636; G02F 1/133615; G02F 2201/343; G02F 2413/02; G02F 2413/13
See application file for complete search history.

(56) References Cited

U.S. PATENT DOCUMENTS

2001/0003473 A1    6/2001  Galabova et al.
2014/0347604 A1*  11/2014  O'Neill ............... G02F 1/13362
                                                            349/64
2019/0310488 A1*  10/2019  Taguchi ............... G02B 27/283

OTHER PUBLICATIONS

Xiang, J., et al., "Electrically tunable laser based on oblique heliconical cholesteric liquid crystal," Proceedings of the National Academy of Sciences, Early Edition, Applied Physical Sciences, Nov. 2016 (5 pages).
Borshch, V., et al., "Nematic twist-bend phase with nanoscale modulation of molecular orientation," Nature Communications, 4:2635, Nov. 5, 2013 (8 pages).
Jokisaari J. P., et al., "Twist-bend nematic phase of the liquid crystal dimer CB7CB: orientational order and conical angle determined by 129Xe and 1H NMR spectroscopy," Liquid Crystals, vol. 42, Nos. 5-6, 708-721 (14 pages).
M. Creech-Eakman, "Polarization," available online at URL: http://kestrel.nmt.edu/~mce/Polarization, retrieved on Mar. 16, 2020 (48 pages).
Unknown author, "The polarization ellipse," Natural Resources Canada, available online at URL: https://www.nrcan.gc.ca/earth-sciences/geomatics/satellite-imagery-air-photos/satellite-imagery-products/educational-resources/9575, retrieved on Mar. 16, 2020 (6 pages).
E. Collet, "The Stokes Polarization Parameters," excerpt from "Fireld Guide to Polarization," SPIE Press, Bellingham, WA (2005) https://spie.org/publications/fg05_p12-14_stokes_polarization_parameters?SSO=1, retrieved on Mar. 16, 2020 (3 pages).
Y. Matsumoto, et al., "P-115: Broad Band Selective Reflection from a Single Cholesteric Liquid Crystal Layer with a Helical Pitch Gradient and its Application," Society of Information Display (2009) Digest, pp. 1559-1562 (4 pages).
International Search Report and Written Opinion dated Jun. 7, 2021, in International Application No. PCT/US2021/021279, filed on Mar. 7, 2021 (12 pages).
Anonymous, "Waveplate," Wikipedia, available online at URL: https://en.wikipedia.org/wiki/Waveplate, retrieve on Jun. 29, 2021 (7 pages).
Mitov, M., "Cholesteric Liquid Crystals with a Broad Light Reflection Band," Advanced Materials, vol. 24, No. 47, pp. 6260-6276, Dec. 11, 2012 (17 pages).
International Search Report and Written Opinion dated Jul. 30, 2021, issued in International Application No. PCT/US2021/021279, filed on Mar. 7, 2021 (18 pages).

* cited by examiner

LIQUID CRYSTAL REFLECTIVE POLARIZER AND PANCAKE LENS ASSEMBLY HAVING THE SAME

TECHNICAL FIELD

The present disclosure relates generally to optical devices and, more specifically, to a liquid crystal reflective polarizer and a pancake lens assembly having the same.

BACKGROUND

Birefringent materials having a chirality may be used in various optical elements or devices. As a type of birefringent material having a chirality, cholesteric liquid crystals ("CLCs"), also known as chiral nematic liquid crystals, have been used in optical elements to reflect or transmit circularly polarized light depending on the handedness of the incident light. For example, CLCs may be configured to primarily reflect a light having a specific circular polarization and primarily transmit a light having an opposite circular polarization. Due to the handedness selectivity of the CLCs, a CLC layer (or a CLC film, a CLC plate, etc.) or a CLC-layers stack may function as a circular reflective polarizer. For example, a circular reflective polarizer including left-handed CLCs ("LHCLCs") can be configured to reflect a left-handed circularly polarized ("LHCP") light and transmit a right-handed circularly polarized ("RHCP") light, and a circular reflective polarizer including right-handed CLCs ("RHCLCs") can be configured to reflect a right-handed circularly polarized ("RHCP") light and transmit a left-handed circularly polarized ("LHCP") light. CLCs can be configured to function over a broad bandwidth such that lights having different wavelengths within the spectrum can be reflected or transmitted. Circular reflective polarizers based on CLCs may be used as multifunctional optical components in a large variety of applications, such as polarization conversion components, brightness enhancement components, or optical path-folding components.

SUMMARY

Consistent with a disclosed embodiment of the present disclosure, an optical device is provided. The optical device includes a first optical element configured to output an elliptically polarized light having one or more predetermined polarization ellipse parameters. The optical device also includes a second optical element including a birefringent material with a chirality. The second optical element is configured to receive the elliptically polarized light from the first optical element and reflect the elliptically polarized light as a circularly polarized light.

Consistent with a disclosed embodiment of the present disclosure, an optical lens assembly is provided. The optical lens assembly includes a first optical element. The first optical element includes an optical waveplate configured to convert an incident light into an elliptically polarized light having one or more predetermined polarization ellipse parameters. The first optical element also includes a mirror configured to transmit a first portion of the elliptically polarized light and reflect a second portion of the elliptically polarized light. The optical lens assembly also includes a second optical element. The second optical element includes a reflective polarizer configured to receive the first portion of the elliptically polarized light from the mirror and reflect the first portion of the elliptically polarized light as a circularly polarized light having a first handedness toward the mirror. The reflective polarizer includes a birefringent material with a chirality.

Consistent with a disclosed embodiment of the present disclosure, an illumination system is provided. The illumination system includes a light source assembly configured to emit a first polarized light having a first handedness. The illumination system includes a light guide plate configured to guide the first polarized light received from the light source assembly and output the first polarized light. The light guide plate includes two wedges coupled to each other at a slanted surface between the two wedges and a reflective polarizer disposed at the slanted surface. The illumination system includes a reflective sheet arranged at a first side surface of the light guide plate and configured to reflect the first polarized light having the first handedness as a second polarized light having a second handedness opposite to the first handedness. The reflective polarizer includes a birefringent material having a chirality, and is configured to selectively transmit the first polarized light having the first handedness and reflect the second polarized light having the second handedness.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
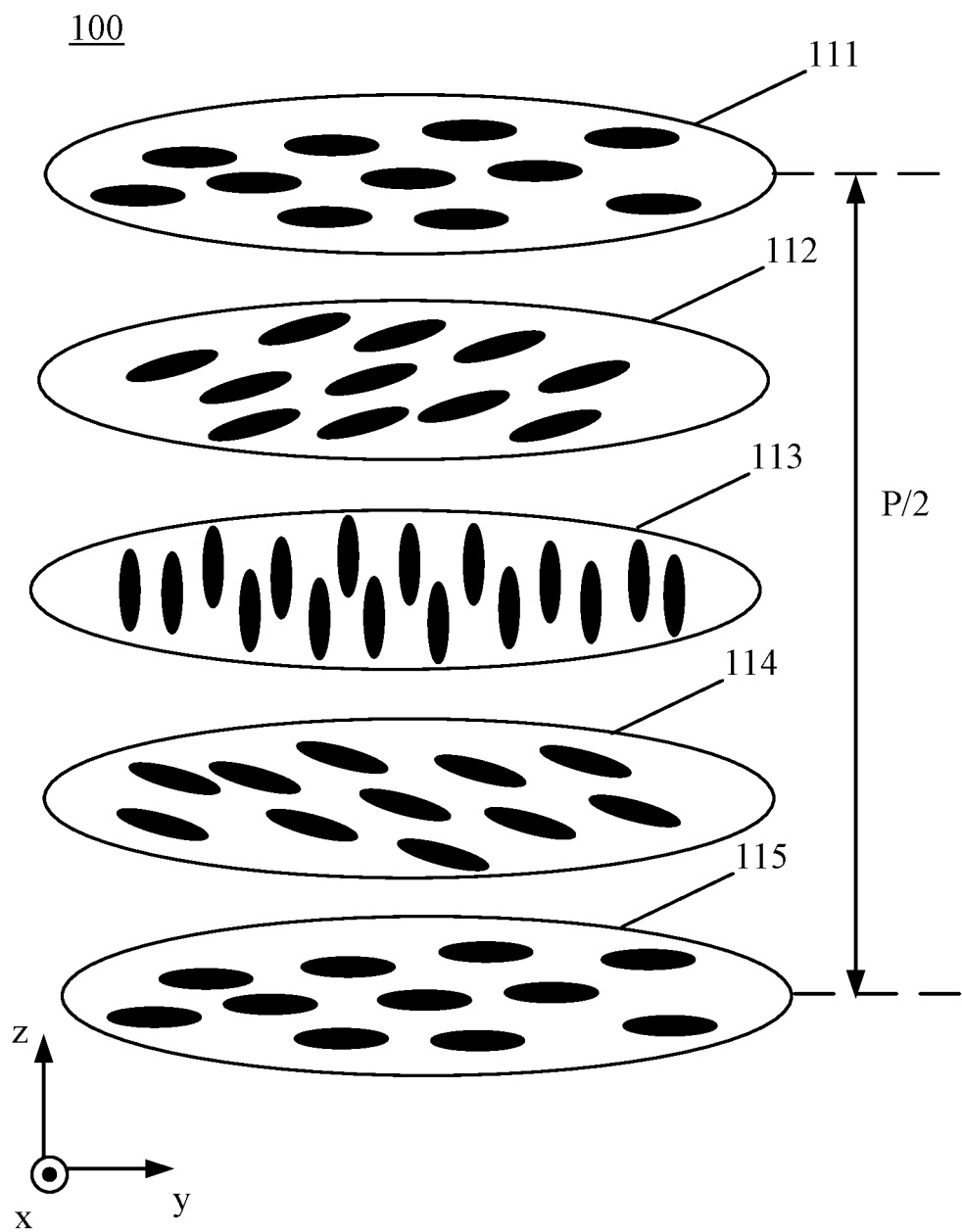
FIG. 1A illustrates a schematic diagram of a director configuration in cholesteric liquid crystals ("CLCs"), according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

The present disclosure provides an optical device that may include a first optical element configured to output an elliptically polarized light having one or more predetermined polarization ellipse parameters. The optical device may also include a second optical element including a birefringent material with a chirality, and configured to receive the elliptically polarized light from the first optical element and reflect the elliptically polarized light as a circularly polarized light. The one or more predetermined polarization ellipse parameters may include at least one of an ellipticity or an orientation angle. In some embodiments, the first optical element may be a transmissive type optical element, a reflective type optical element, an absorptive type optical element, or a combination thereof. For example, the first optical element may be an optical waveplate, which may be configured to convert a linearly polarized light or a circularly polarized light into the elliptically polarized light having the one or more predetermined polarization ellipse parameters. In some embodiments, the first optical element may be a light source assembly. In some embodiments, the light source assembly may generate and output the elliptically polarized light having the one or more predetermined polarization ellipse parameters. In some embodiments, the optical waveplate may be a part of the light source assembly. In some embodiments, the optical waveplate may be separately provided from the light source assembly. The second optical element may be configured to transmit the elliptically polarized light having one or more predetermined polarization ellipse parameters at a light transmittance of substantially zero, resulting a substantially zero light leakage of the optical device for the elliptically polarized light having one or more predetermined polarization ellipse parameters. In some embodiments, the second optical element may be a reflective polarizer based on the birefringent material with a chirality. The light leakage of the reflective polarizer may be suppressed through configuring properties (e.g., one or more predetermined polarization ellipse parameters) of an incident light of the reflective polarizer using the first optical element.

In some embodiments, the chirality of the birefringent material may be a property of the birefringent material itself, e.g., the birefringent material may include chiral crystal molecules, or molecules of the birefringent material may include a chiral functional group. In some embodiments, the chirality of the birefringent material may be introduced by chiral dopants doped into the birefringent material. In some embodiments, the birefringent material with a chirality may include twist-bend nematic LCs (or LCs in twist-bend nematic phase), in which the LC directors may exhibit periodic twist and bend deformations forming a conical helix with doubly degenerate domains having opposite handedness. The LC directors in twist-bend nematic LCs may be tilted with respect to the helical axis and, thus, twist-bend nematic phase may be considered as the generalized case of the conventional nematic phase in which the LC directors are orthogonal with respect to the helical axis. Cholesteric liquid crystals ("CLCs") are a type of birefringent material with a chirality. In the following descriptions, for illustrative purposes, CLCs are used as an example of the birefringent material with a chirality. CLC reflective polarizers (i.e., reflective polarizers based on CLCs) are used as an example of the reflective polarizer based on the birefringent material with a chirality. In some embodiments, optical elements (e.g., reflective polarizers) with suppressed light leakage may also be configured based on another suitable birefringent material with a chirality, following the same design principles for the CLC reflective polarizer described below.

Cholesteric liquid crystals ("CLCs") are liquid crystals that have a helical structure and, thus, exhibit chirality, i.e., handedness. CLCs are also known as chiral nematic liquid crystals. For an incidence wavelength within the reflection band of the CLCs, a circularly polarized light with a handedness that is the same as the handedness of the helical structure of the CLCs may be primarily or substantially reflected, and a circularly polarized light with a handedness that is different from (e.g., opposite to) the handedness of the helical structure of the CLCs may be primarily or substantially transmitted. Due to the handedness selectivity of the CLCs, a CLC layer (or a CLC film, a CLC plate, etc.) may function as a CLC reflective polarizer. In some embodiments, for both of the reflected light and transmitted light of the CLCs, their polarization states may remain unchanged. In some embodiments, due to the waveplate effect of the CLCs, the polarization states of the reflected and/or the transmitted lights may be changed, which may result in a light leakage of the CLC layer and, accordingly, degrade the extinction ratio of the CLC reflective polarizer. Further, the light leakage of the CLC layer may increase as the incidence angle increases.

The present disclosure provides an optical device configured to reduce the light leakage of a CLC layer. In some embodiments, the light leakage of the CLC layer may be reduced by controlling the ellipticity of a polarized incident light and/or a clocking angle (e.g., an orientation angle) between the CLC layer and the polarized incident light. In some embodiments, the property (e.g., polarization ellipse parameters) of the polarized incident light may be adjusted or modified to match the property of the CLC layer (e.g., through ellipticity matching), such that the output of the CLC layer is primarily or substantially a reflected circularly polarized light, with reduced light transmittance (e.g., light transmittance of the CLC layer is substantially zero). To modify optical properties of the light incident onto the CLC layer, the optical device may include an optical element disposed upstream of the CLC layer in a light path, and configured to convert the light into an elliptically polarized light having one or more predetermined polarization ellipse parameters, before the light is incident onto the CLC layer. In some embodiments, the optical element may be a transmissive type optical element, a reflective type optical element, an absorptive type optical element, or a combination thereof. In some embodiments, the optical device may include an optical element disposed upstream of the CLC layer in a light path, and configured to output an elliptically polarized light having one or more predetermined polarization ellipse parameters toward the CLC layer as an incident light of the CLC layer.

In some embodiments, the optical element disposed upstream of the CLC layer in a light path may be an optical waveplate. The optical waveplate may be a quarter-wave plate ("QWP"). The quarter-wave plate may be oriented relative to the polarization direction of an incident light (e.g., a linearly polarized incident light) onto the QWP or otherwise configured based on the property of the incident light to convert the incident light into the elliptically polarized light having one or more predetermined polarization ellipse parameters. The one or more predetermined polarization ellipse parameters of the elliptically polarized light may be determined or selected, e.g., through an optimization, such that a transmitted portion of the elliptically polarized light incident onto the CLC layer is significantly reduced or is substantially zero. In some embodiments, the light transmittance (or light leakage) of the CLC layer for the elliptically polarized light may be reduced to be below 0.05%. Improved optical performance of the optical device may be achieved due to the reduction in the light leakage.

Figure 1B:
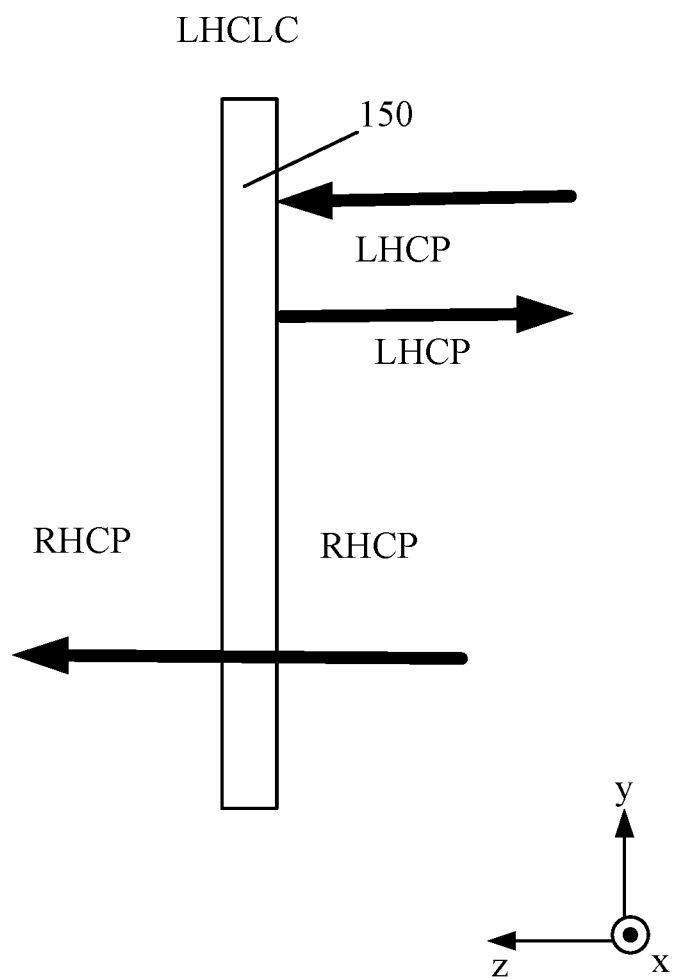
FIG. 1B illustrates polarization selective reflectivity of the CLCs, according to an embodiment of the present disclosure.

FIG. 1A illustrates a schematic diagram of a director configuration 100 of cholesteric liquid crystals ("CLCs") and FIG. 1B illustrates polarization selective reflectivity of the CLCs shown in FIG. 1A. CLCs are liquid crystals that have a helical structure and, thus, exhibit chirality, i.e., handedness. CLCs are also known as chiral nematic liquid crystals. In the schematic diagram shown in FIG. 1A, nematic LC molecules are represented by solid rods. CLCs may be organized in one or more layers 111, 112, 113, 114, 115 with no positional ordering within the layers. For illustrative purposes, in the schematic diagram shown in FIG. 1A, the layers are separated apart from one another to better illustrate the structure. Although five layers are shown, the number of layers is not limited by the present disclosure, which may be any suitable number, such as 1, 2, 3, 4, 6, 7, etc. The nematic LC directors (e.g., long axes of the CLC molecules) may rotate along an axial direction (e.g., z-direction shown in FIG. 1A) of the layers due to the presence of chiral dopants. In the same layer, the nematic LC directors may be oriented in the same direction. In some embodiments, the variation of the nematic LC directors may be periodic. The period of the variation of the nematic LC directors, i.e., an axial length over which the nematic LC directors rotate by 360°, is known as a helix pitch P. In some embodiments, the variation of the nematic LC directors may repeat at every half pitch (P/2), as the nematic LC directors at 0° and ±180° may be equivalent. The helix pitch P may determine a reflection band of the CLCs, i.e., a band of incidence wavelengths that may be reflected by the CLCs via Bragg Reflection. In some embodiments, the helix pitch P may be of the same order as wavelengths of visible lights. The reflection band of the CLCs may be centered at a wavelength $\lambda_0=n*P$, where n may be an average refractive index of the CLCs that may be calculated as $n=(n_e+n_o)/2$. In these equations, $n_e$ and $n_o$ represent the extraordinary and ordinary reflective indices of the nematic LCs, respectively, and P represents the helix pitch of the CLCs. A reflection bandwidth $\Delta\lambda$ of the CLCs may be calculated as $\Delta\lambda=\Delta n*P$, which may be proportional to the birefringence $\Delta n$ of the CLCs, where $\Delta n=n_e-n_o$.

For an incidence wavelength within the reflection band of the CLCs, a circularly polarized light with a handedness that is the same as the handedness of the helical structure of the CLCs may be primarily or substantially reflected, and a circularly polarized light with a handedness that is different from (e.g., opposite to) the handedness of the helical structure of the CLCs may be primarily or substantially transmitted. For example, as shown in FIG. 1B, left-handed CLCs ("LHCLCs") 150 may exhibit a high reflection characteristic (e.g., a high reflectance) for a left-handed circularly polarized ("LHCP") incident light and a high transmission characteristic (e.g., a high transmittance) for a right-handed circularly polarized ("RHCP") incident light. That is, for a light having an incidence wavelength within the reflection band of the LHCLCs 150, when the light is an LHCP light (or includes an LHCP light portion), the LHCLCs 150 may primarily or substantially reflect the LHCP light (or the LHCP light portion). When the light is an RHCP light (or includes an RHCP light portion), the LHCLCs 150 may primarily or substantially transmit the RHCP light (or the RHCP light portion). Due to the handedness selectivity of the CLCs, a thin film of CLCs may be used to realize a reflective polarizer. In some embodiments, for both of the reflected light and transmitted light of the CLCs 150, their polarization states may remain unchanged. In some embodiments, due to the waveplate effect of the CLCs 150, the polarization states of at least one of the reflected light or the transmitted light may be changed, which may result in a light leakage. When the incidence wavelength is outside of the reflection band of the LHCLCs 150, a circularly polarized light may be transmitted by the LHCLCs 150 regardless of the handedness. An unpolarized light or a linearly polarized light can be decomposed into a RHCP light (or a RHCP component or portion) and an LHCP light (or an LHCP component or portion), where each component may be selectively reflected or transmitted depending on the handedness of the component and the handedness of the helical structure of the CLCs.

Figure 2A:
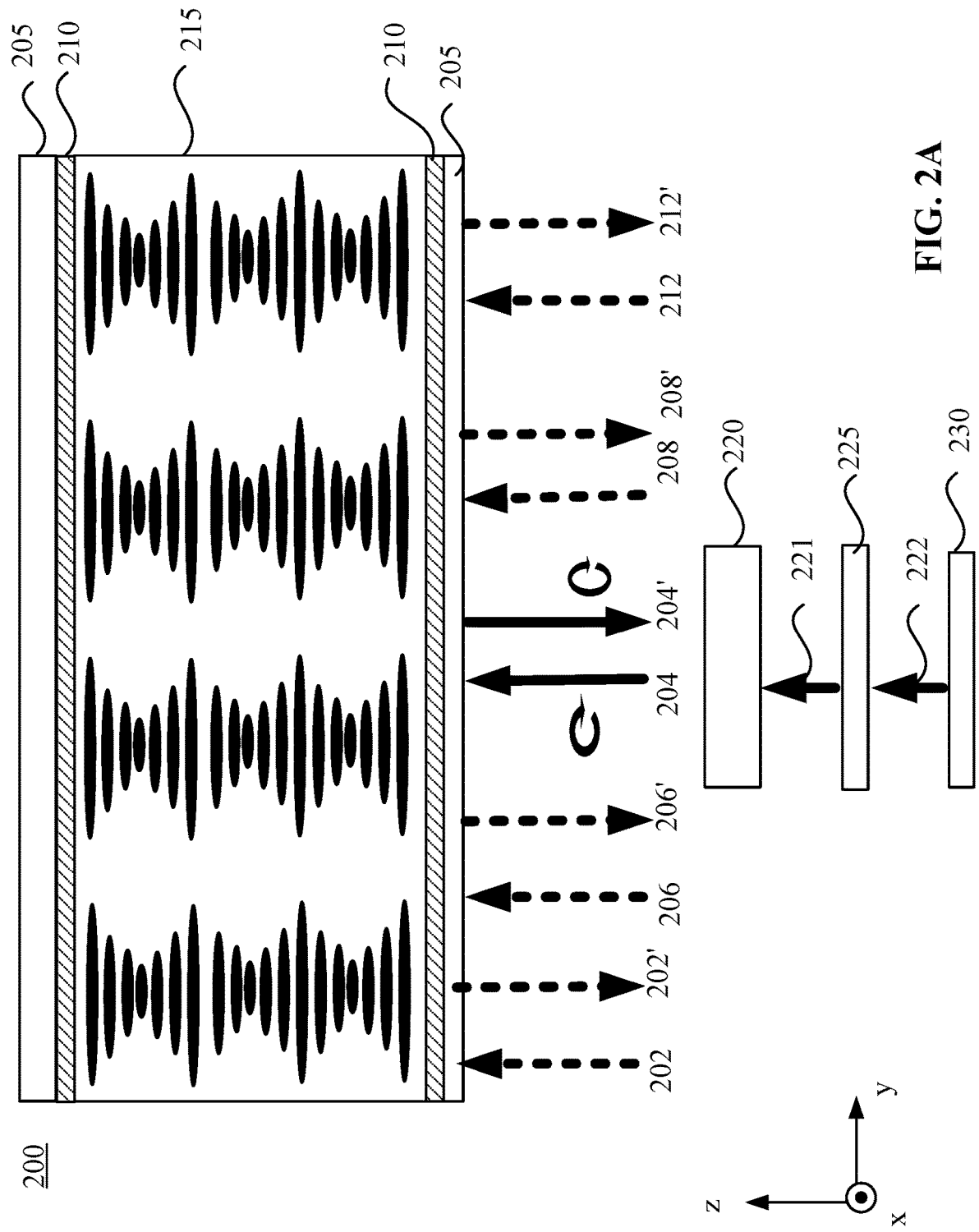
FIG. 2A illustrates a cross section of a cholesteric liquid crystal ("CLC") reflective polarizer, according to an embodiment of the present disclosure.

FIG. 2A illustrates a y-z cross section of a CLC reflective polarizer 200, according to an embodiment of the present disclosure. As shown in FIG. 2A, the CLC reflective polarizer 200 may include a CLC layer 215 having a helical structure that includes a constant helix pitch (e.g., repeat of a same, fixed helix pitch). An axis of the helix may be normal (e.g., perpendicular) to the surface of the CLC layer 215. In some embodiments, the CLC reflective polarizer 200 may further include one or more substrates 205 for support and protective purposes. Two substrates 205 are shown in FIG. 2A for illustrative purposes. The number of substrates is not limited to two and may be any suitable number. The substrates 205 may be optically transparent in the visible band (about 380 nm to about 700 nm). In some embodiments, the substrates 205 may also be optically transparent in some or all of the infrared ("IR") band (e.g., about 700 nm to about 1 mm, or any portion thereof). For example, the substrate 205 may include a glass, a plastic, a sapphire, etc. The substrate 205 may be rigid, semi-rigid, flexible, or semi-flexible. In some embodiments, the substrate 205 may be a part of another optical device or another optoelectrical device. For example, the substrate 205 may be a part of a functional device, such as a display screen. In some embodiments, the substrate 205 may be a part of an optical lens assembly, such as a lens substrate of the optical lens assembly. In some embodiments, at least one of the substrates 205 may be provided with an alignment layer 210, which may be configured to provide an initial alignment of the CLCs. In the embodiment shown in FIG. 2A, two alignment layers 210 are provided for illustrative purposes, with each alignment layer 210 being coupled (e.g., stacked) with each substrate 205. The number of the alignment layers 210 is not limited to two, and may be any suitable number. The number of the alignment layers may or may not be the same as the number of the substrates. In some embodiments, the alignment layer 210 may provide anti-parallel homogeneous alignments of the CLCs.

In some embodiments, the helix pitch of the CLCs may be of the same order as the wavelengths of visible lights. Accordingly, the CLC layer 215 may have a reflection band in the visible spectrum. When the incidence wavelength is within the reflection band of the CLC layer 215, a circularly polarized light having a handedness that is the same as that of the helical structure of the CLC layer 215 may be primarily or substantially reflected, and a circularly polarized light having a handedness that is different from (e.g., opposite to) that of the helix structure of the CLC layer 215 may be primarily or substantially transmitted. Due to the waveplate effect of the CLC layer 215, the polarization states of at least one of the reflected light or the transmitted light may be changed to an elliptical polarization. This phenomenon may be referred to as depolarization. Depolarization may result in a light leakage of the CLC layer 215, which may degrade an extinction ratio of the CLC reflective polarizer 200.

In the disclosed embodiments, the CLC layer 215 may be coupled to an optical waveplate 220. The optical waveplate 220 may be configured to convert an incident light 221 into an elliptically polarized light 204 having one or more predetermined polarization ellipse parameters, and direct the elliptically polarized light 204 toward the CLC layer 215. In some embodiments, the optical waveplate 220 may be a quarter-wave plate ("QWP"). In some embodiments, the incident light 221 may be a linearly polarized light that is substantially normally incident onto the QWP, and the polarization axis of the QWP may be oriented or configured relative to a polarization direction of the linearly polarized light 221 to output an elliptically polarized light 204 having one or more predetermined polarization ellipse parameters toward the CLC layer 215. In some embodiments, the CLC layer 215 may be coupled to a light source 230 configured to emit an unpolarized light 222. In some embodiments, a linear polarizer 225 may be disposed between the optical waveplate 220 and the light source 230. The linear polarizer 225 may be configured to convert the unpolarized light 222 emitted by the light source 230 into a linearly polarized light 221 incident onto the optical waveplate 220. In some embodiments, the light source 230 may directly emit a linearly polarized light (e.g., light 222 may be a linearly polarized light). In such embodiments, the linear polarizer 225 may be omitted. In some embodiments, the light source 230 may emit a circularly polarized light (e.g., the light 222 may be a circularly polarized light). In such embodiments, the optical waveplate 220 may be a first optical waveplate. A second optical waveplate (not shown) may be disposed between the first optical waveplate 220 and the light source 230 to convert the circularly polarized light into a linearly polarized light incident onto the first optical waveplate 220.

In some embodiments, the light incident onto the optical waveplate 220 may be a circularly polarized light. The optical waveplate 220 may be a QWP, or may be any other suitable waveplate. The optical waveplate 220 may be configured (e.g., properties of the optical waveplate 220 such as the optical axis, thickness, materials, etc. may be configured) such that the light output from the optical waveplate 220 is an elliptically polarized light having the one or more predetermined polarization ellipse parameters. The elliptically polarized light output from the optical waveplate 220 having the one or more predetermined polarization ellipse parameters may be directed onto the CLC layer 215, and may be substantially reflected by the CLC layer 215 as a circularly polarized light, with the light transmittance being substantially suppressed (e.g., the light transmittance may be significantly reduced or may be substantially zero). Configuration of the optical waveplate 220 may be performed relatively statically or relatively dynamically. For example, when the property of the CLC layer 215 is fixed and the light incident onto the optical waveplate 220 is fixed, the property of the optical waveplate 220 may be suitably determined or configured such that an elliptically polarized light having the one or more predetermined polarization ellipse parameters is output by the optical waveplate 220, and directed toward the CLC layer 215. When the elliptically polarized light having the one or more predetermined polarization ellipse parameters is incident onto the CLC layer 215, the elliptically polarized light may be substantially converted into and reflected as a circularly polarized light, with a reduced light transmittance (or light leakage) through the CLC layer 215. During operations, the property of the optical waveplate 220 may remain substantially the same. In some embodiments, when the light incident onto the optical waveplate 220 may change over time, and/or when the property of the CLC layer 215 may change over time, the property of the optical waveplate 220 may be dynamically adjusted (e.g., by adjusting an electric field applied to the optical waveplate 220 such that the optical waveplate 220 outputs an elliptically polarized light having the one or more predetermined polarization ellipse parameters toward the CLC layer 215.

In some embodiments, the polarization ellipse parameters of the elliptically polarized light may include at least one of an orientation angle $\Psi$ or an ellipticity $\varepsilon$. Due to the waveplate effect of the CLC layer 215, the elliptically polarized light having one or more of the predetermined orientation angle $\Psi$ and ellipticity $\varepsilon$ (the value(s) or ranges of which may be determined or calculated through optimization) may be substantially or primarily reflected as a circularly polarized light by the CLC layer 215, thereby reducing the amount of light transmitted through the CLC layer 215. As a result, the light leakage caused by the transmitted light may be significantly reduced or suppressed. In some embodiments, the optical waveplate 220 may be a part of the CLC reflective polarizer 200. In some embodiments, the optical waveplate 220 may be a part of another element or device other than the CLC reflective polarizer 200.

Figure 2B:
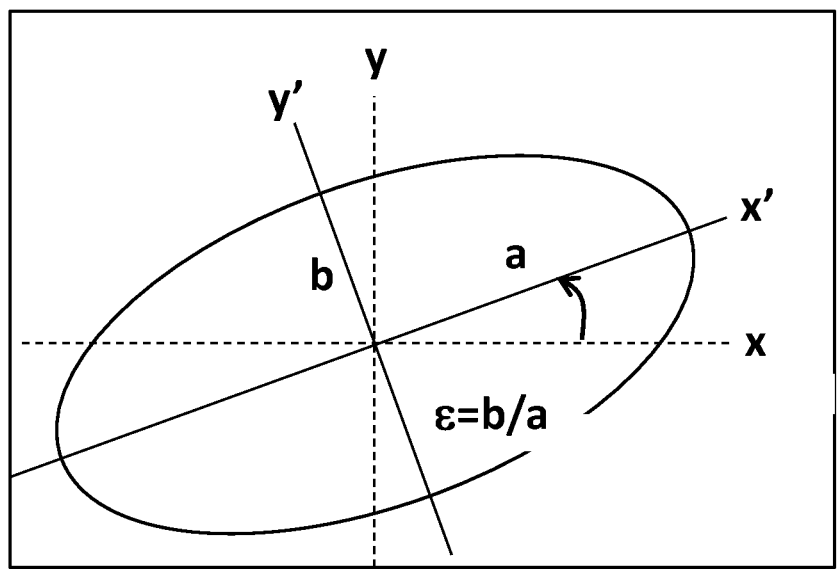
FIG. 2B illustrates a polarization ellipse diagram of a polarized light, according to an embodiment of the present disclosure.

FIG. 2B illustrates a polarization ellipse diagram 240 of a polarized light. The Electric Field of a plane wave can be described as the vector sum of two orthogonal components, e.g., a horizontal component and a vertical component. The two components may be characterized by their respective amplitudes and the relative phase between the two components. When viewed along a direction of wave propagation, the tip of the Electric Field vector of a fully polarized wave traces out a regular pattern. In a general form, the pattern may be represented by an ellipse, which may be referred to as a polarization ellipse as shown in FIG. 2B. The ellipse has a semi-major axis x' of length a, and a semi-minor axis y' of length b, where a and b correspond to the amplitudes of the two orthogonal components, respectively. The angle of the semi-major axis x', as measured counter-clockwise from a positive horizontal axis x (when coupled to the CLC layer 215, the positive horizontal axis x is the alignment direction of the CLC layer 215) is the orientation angle $\Psi$ of the plane wave, where $0° \leq \Psi \leq 180°$. The degree to which the ellipse is oval may be represented by a shape parameter named eccentricity or ellipticity $\varepsilon$, defined as $\varepsilon = b/a$, which is a ratio of the length of the semi-minor axis y' to that of the semi-major axis x', where $-1 \leq \varepsilon \leq 1$. An LHCP light may have $\varepsilon = -1$, and an RHCP light may have $\varepsilon = 1$. A left-handed elliptically polarized ("LHEP") light may have $-1 < \varepsilon < 0$ and $0° \leq \Psi \leq 180°$, and a right-handed elliptically polarized ("RHEP") light may have $0 < \varepsilon < 1$ and $0° \leq \Psi \leq 180°$. A linearly polarized light may have $\varepsilon = 0$ and $0° \leq \Psi \leq 180°$.

In some embodiments, the CLC layer 215 may include LCs having a birefringence in a range of about 0.15 to about 0.4. To reduce the light leakage (e.g., to reduce the light transmittance) of the CLC layer 215 for an elliptically polarized incident light having the same handedness as the helical structure of the CLC layer 215, the orientation angle $\Psi$ of the elliptically polarized incident light may be configured to be a value in a range of about $75°≤\Psi≤90°$, about $75°≤\Psi≤85°$, about $75°≤\Psi≤80°$, about $80°≤\Psi≤90°$, about $80°≤\Psi≤85°$, about $85°≤\Psi≤90°$, about $76°≤\Psi≤89°$, about $77°≤\Psi≤88°$, about $78°≤\Psi≤87°$, or about $79°≤\Psi≤86°$. In some embodiments, the orientation angle $\Psi$ may be in a range of $n_1°≤\Psi≤n_2°$, where $n_1$ may be any suitable value equal to or greater than 75, and $n_2$ may be any suitable value equal to or less than 90 and greater than $n_1$. In some embodiments, the ellipticity $\varepsilon$ of the elliptically polarized incident light may be configured to be a value in a range of about $-1<\varepsilon≤-0.85$ when the chirality of the birefringent material is left-handed, e.g., when the CLC layer 215 includes LHCLCs (referred to as an LHCLC layer). For example, when the CLC layer 215 is an LHCLC layer, the ellipticity $\varepsilon$ of the elliptically polarized incident light may be configured to be a value in a range of about $-0.95≤\varepsilon≤-0.85$, about $-0.9≤\varepsilon≤-0.85$, about $-0.95≤\varepsilon≤-0.9$, about $-1<\varepsilon≤-0.9$, or about $-1<\varepsilon≤-0.95$. The ellipticity $\varepsilon$ of the elliptically polarized incident light may be configured to be a value in a range of about $0.85≤\varepsilon<1$ when the chirality of the birefringent material is right-handed, e.g., when the CLC layer 215 includes RHCLCs (referred to an RHCLC layer). For example, when the CLC layer 215 is an RHCLC layer, the ellipticity $\varepsilon$ of the elliptically polarized incident light may be configured to be a value in a range of about $0.85≤\varepsilon≤0.95$, about $0.85≤\varepsilon≤0.9$, about $0.9≤\varepsilon≤0.95$, about $0.9≤\varepsilon<1$, or about $0.95≤\varepsilon<1$. The values of the orientation angle $\Psi$ and ellipticity $\varepsilon$ of the elliptically polarized incident light may vary as the birefringence of the LCs included in the CLC layer 215 varies.

Figure 2C:
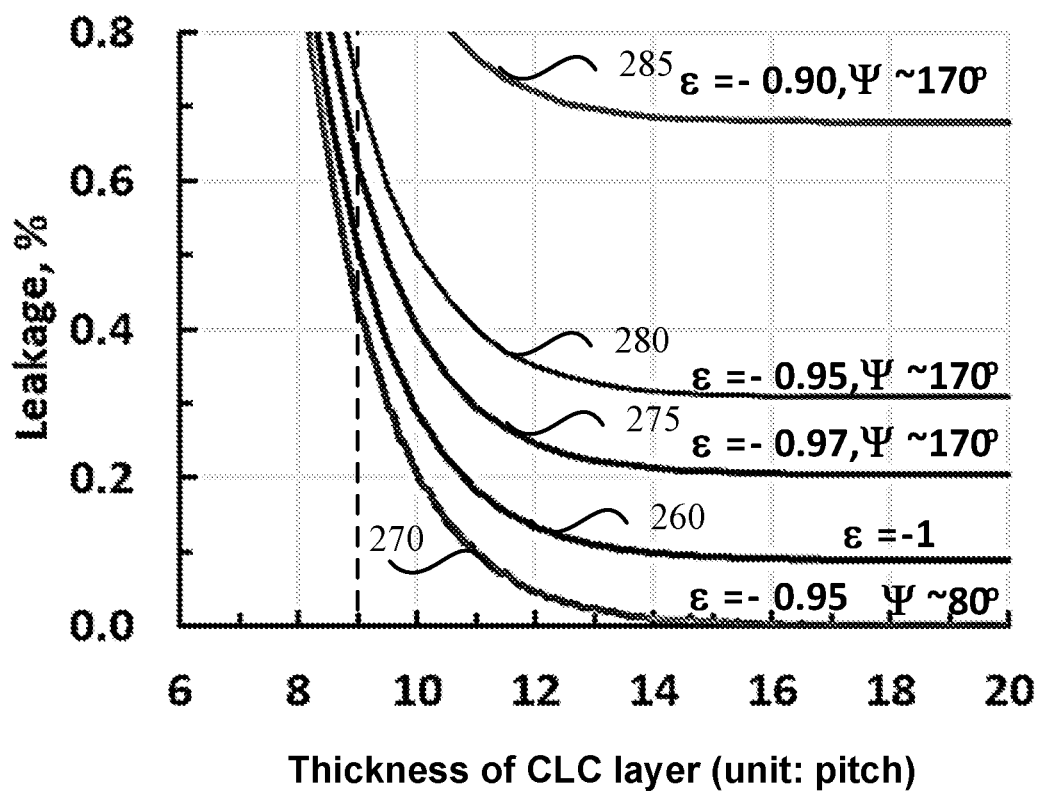
FIG. 2C illustrates simulation results showing light leakage versus thickness of a CLC layer for incident lights with different polarization ellipse parameters, according to an embodiment of the present disclosure.

FIG. 2C illustrates simulation results showing a light leakage versus the thickness of the CLC layer 215 for substantially normally incident lights with different polarization ellipse parameters. For illustrative purposes, the CLC layer 215 including LHCLCs (referred to as an LHCLC layer 215) is used in the simulation. As shown in FIG. 2C, the horizontal axis is the thickness the CLC layer 215 (in a unit of pitch), and the vertical axis is the light leakage, which is the light transmittance of the CLC layer 215 for a polarized incident light having the same handedness (e.g., left-handedness) as that of the helical structure of the CLC layer 215. The light leakage of the CLC layer 215 is evaluated for five normally incident lights with different polarization ellipse parameters, respectively. Referring to FIG. 2A and FIG. 2C, curve 260 shows the thickness dependent light leakage of the CLC layer 215 for an LHCP incident light 202 ($\varepsilon=-1$), curve 270 shows the thickness dependent light leakage for a first LHEP incident light 204 ($\varepsilon=-0.95$ and $\Psi=80°$), curve 275 shows the thickness dependent light leakage for a second LHEP incident light 206 ($\varepsilon=-0.97$ and $\Psi=170°$), curve 280 shows the thickness dependent light leakage for a third LHEP incident light 208 ($\varepsilon=-0.95$ and $\Psi=170°$), and curve 285 shows the thickness dependent light leakage for a fourth LHEP incident light 212 ($\varepsilon=-0.90$ and $\Psi=170°$). In FIG. 2A, the first LHEP incident light 204 refers to the light output by the optical waveplate 220, according to an embodiment of the present disclosure. The LHCP incident lights 202 and the LHEP incident lights 206, 208 and 212 are hypothetical incident lights for comparison with the LHEP incident light 204, and hence are shown with dotted arrows in FIG. 2A.

As shown in FIG. 2A, the CLC layer 215 may reflect the LHCP incident light 202 ($\varepsilon=-1$) as an LHEP light 202' due to the waveplate effect of the CLC layer 215. Referring to FIG. 2C, as shown in curve 260, the light leakage of the CLC layer 215 is about 0.55% when the thickness the CLC layer 215 is about 9 pitches. As the thickness the CLC layer 215 gradually increases to about 14 pitches, the light leakage of the CLC layer 215 gradually decreases to a minimum value of about 0.1%. As the thickness the CLC layer 215 further increases to about 20 pitches, the light leakage of the CLC layer 215 remains substantially the same, which is about 0.1%.

As shown in FIG. 2A, the CLC layer 215 may reflect the first LHEP incident light 204 ($\varepsilon=-0.95$ and $\Psi=80°$) as an LHCP light 204'. Comparing curves 260 and 270 shown in FIG. 2C, the CLC layer 215 exhibits a lower light leakage for the first LHEP incident light 204 ($\varepsilon=-0.95$ and $\Psi=80°$) than for the LHCP incident light 202 ($\varepsilon=-1$) at the same thickness. As shown in curve 270, the light leakage of the CLC layer 215 is about 0.45% when the thickness the CLC layer 215 is about 9 pitches. As the thickness the CLC layer 215 gradually increases to about 14 pitches, the light leakage of the CLC layer 215 gradually decreases to a minimum value that is substantially 0. As the thickness the CLC layer 215 further increases to about 20 pitches, the light leakage of the CLC layer 215 remains substantially the same, which is about 0. In some applications, the thickness of the CLC layer 215 may be in a range of 10 pitches to 11 pitches. In this thickness range, as shown in the curve 260, for the LHCP light 202 ($\varepsilon=-1$), the leakage ranges from about 0.3% (10 pitches) to about 0.18% (11 pitches). In the same thickness range, as shown in the curve 270, for the first LHEP light 204 ($\varepsilon=-0.95$ and $\Psi=80°$), the leakage ranges from about 0.2% (10 pitches) to about 0.08% (11 pitches). Thus, the leakage for the first LHEP incident light 204 ($\varepsilon=-0.95$ and $\Psi=80°$) is reduced by about 0.1% in the thickness range of 10 pitches to 11 pitches. In other applications where a thicker CLC 215 layer may be used (e.g., thickness greater than 11 pitches), the leakage for the first LHEP incident light 204 is consistently reduced by about 0.1%. In some applications of the CLC layer 215, such as in virtual reality ("VR") devices including one or more CLC reflective polarizers, even a 0.1% light leakage may significantly degrade the optical performance of the VR devices.

As shown in FIG. 2A, the CLC layer 215 may reflect the second LHEP incident light 206 ($\varepsilon=-0.97$ and $\Psi=170°$) as an LHEP light 206'. Referring to FIG. 2C, comparing curve 275 ($\varepsilon=-0.97$ and $\Psi=170°$) and curves 260 ($\varepsilon=-1$) and 270 ($\varepsilon=-0.95$ and $\Psi=80°$), at the same thickness, the CLC layer 215 exhibits the highest light leakage for the second LHEP incident light 206 ($\varepsilon=-0.97$ and $\Psi=170°$) among the three incident lights. As shown in curve 275, the light leakage of the CLC layer 215 is about 0.65% when the thickness of the CLC layer 215 is about 9 pitches. As the thickness the CLC layer 215 gradually increases to about 14 pitches, the light leakage of the CLC layer 215 gradually decreases to a minimum value of about 0.2%. As the thickness the CLC layer 215 further increases to about 20 pitches, the light leakage of the CLC layer 215 remains substantially the same, which is about 0.2%.

As shown in FIG. 2A, the CLC layer 215 may reflect the third LHEP incident light 208 ($\varepsilon=-0.95$ and $\Psi=170°$) as an LHEP light 208'. Referring to FIG. 2C, comparing curve 280 ($\varepsilon=-0.95$ and $\Psi=170°$) with curves 260 ($\varepsilon=-1$), 270 ($\varepsilon=-0.95$ and $\Psi=80°$), and 275 ($\varepsilon=-0.97$ and $\Psi=80°$), at the same thickness, the CLC layer 215 exhibits the highest light leakage for the third LHEP incident light 208 ($\varepsilon=-0.95$ and $\Psi=170°$) among the four incident lights. As shown in curve 280, the light leakage of the CLC layer 215 is about 0.75% when the thickness of the CLC layer 215 is about 9 pitches. As the thickness the CLC layer 215 gradually increases to about 14 pitches, the light leakage of the CLC layer 215 gradually decreases to a minimum value of about 0.3%. As the thickness the CLC layer 215 further increases to about 20 pitches, the light leakage of the CLC layer 215 remains substantially the same, which is about 0.3%.

As shown in FIG. 2A, the CLC layer 215 may reflect the fourth LHEP incident light 212 ($\varepsilon$=−0.90 and $\Psi$=170°) as an LHEP light 212'. Referring to FIG. 2C, comparing curve 285 ($\varepsilon$=−0.90 and $\Psi$=170°) with curves 260 ($\varepsilon$=−1), 270 ($\varepsilon$=−0.95 and $\Psi$=80°), and 275 ($\varepsilon$=−0.97 and $\Psi$=80°), and 280 ($\varepsilon$=−0.95 and $\Psi$=170°), at the same thickness, the CLC layer 215 exhibits the highest light leakage for the fourth LHEP incident light 212 ($\varepsilon$=−0.90 and $\Psi$=170°) among the five incident lights. As shown in curve 285, the light leakage of the CLC layer 215 is greater than 0.8% when the thickness of the CLC layer 215 is about 9 pitches. The light leakage of the CLC layer 215 is decreased to about 0.75% when the thickness of the CLC layer 215 increases to about 11 pitches. As the thickness the CLC layer 215 gradually increases to about 14 pitches, the light leakage of the CLC layer 215 gradually decreases to a minimum value of about 0.7%. As the thickness the CLC layer 215 further increases to about 20 pitches, the light leakage of the CLC layer 215 remains substantially the same, which is about 0.7%.

Referring to FIG. 2A and FIG. 2C, for a polarized light having the same handedness as that of the helical structure of the CLC layer 215, one or more of the orientation angle $\Psi$ and the ellipticity $\varepsilon$ of the polarized light may affect the light leakage of the CLC layer 215, thereby affecting an extinction ratio of the CLC reflective polarizer 200. The CLC layer 215 may have a reduced light leakage for an elliptically polarized incident light having one or more of predetermined orientation angle $\Psi$ and ellipticity $\varepsilon$ as compared to a circularly polarized incident light. The orientation angle $\Psi$ of the elliptically polarized incident light may affect the light leakage of the CLC layer 215. When the ellipticity $\varepsilon$ (e.g., −0.95) is the same, different orientation angles $\Psi$ of elliptically polarized incident lights may result in significantly different light leakages. Comparing curves 270 and 280 as shown in FIG. 2C, a 90-degree difference in the orientation angle $\Psi$ may lead to a 0.3% difference in the minimum light leakage. The ellipticity $\varepsilon$ of the elliptically polarized incident light may affect the light leakage of the CLC layer 215. When the orientation angle $\Psi$ (e.g., $\Psi$=170°) is the same, different ellipticities c of elliptically polarized incident lights may result in significantly different light leakages. Comparing curves 275, 280, and 285 as shown in FIG. 2C, at the same thickness, the CLC layer 215 exhibits the highest light leakage for the fourth LHEP incident light 212 ($\varepsilon$=−0.90) and the lowest light leakage for the second LHEP incident light 206 ($\varepsilon$=−0.97) among the three incident lights. A difference of about 0.7 in the ellipticity $\varepsilon$ (e.g., $\varepsilon$=−0.97 and $\varepsilon$=−0.90) may lead to a 0.55% difference in the minimum light leakage.

Referring to FIG. 2A and FIG. 2C, by specifically configuring one or more of the orientation angle $\Psi$ and ellipticity $\varepsilon$ of the elliptically polarized light incident onto the CLC layer 215, the disclosed optical device may reduce the light leakage of the CLC layer 215. As shown in FIG. 2C, for a polarized incident light, the minimum light leakage of the CLC layer 215 may vary with the thickness of the CLC layer 215. For example, by specifically configuring one or more of the orientation angle $\Psi$ and ellipticity $\varepsilon$ of the elliptically polarized light incident onto the CLC layer 215, the disclosed optical device may reduce the minimum light leakage of the CLC layer 215 to be below or equal to 0.05% when the thickness is above about 12 pitches. When the thickness of the CLC layer 215 is in a range of about 10 pitches to 11 pitches, by specifically configuring one or more of the orientation angle $\Psi$ and ellipticity $\varepsilon$ of the elliptically polarized light incident onto the CLC layer 215, the disclosed optical device may reduce the minimum light leakage of the CLC layer 215 to be below or equal to 0.1%.

Figure 2D:
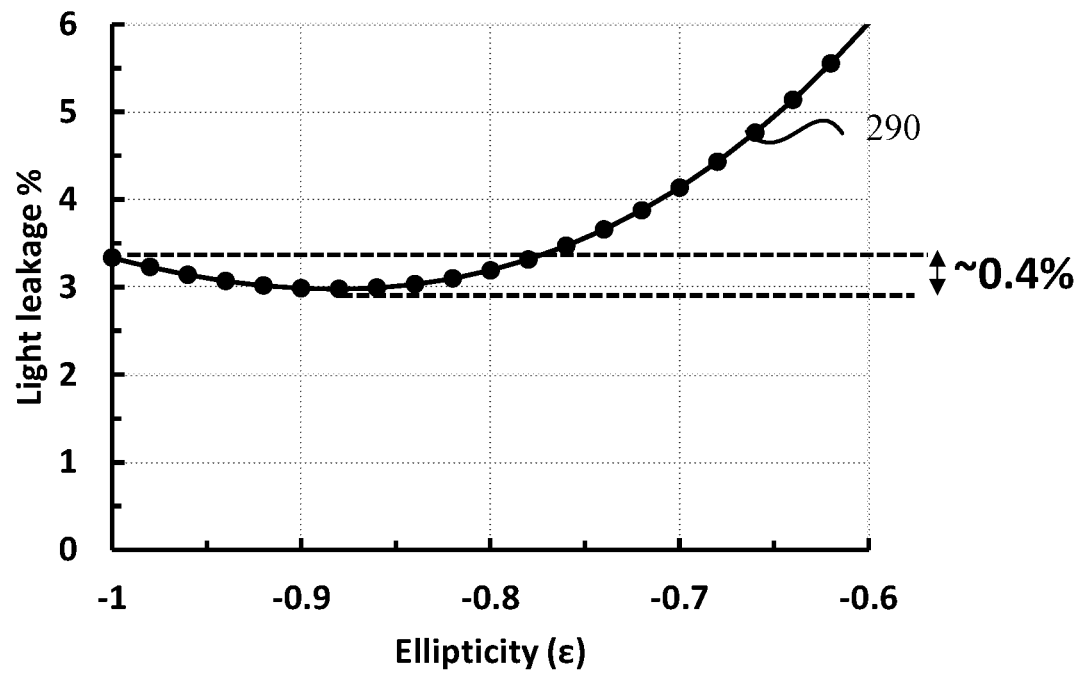
FIG. 2D illustrates experimental results showing light leakage of a CLC layer versus ellipticity of a light incident onto the CLC layer, according to an embodiment of the present disclosure.

FIG. 2D illustrates experimental results showing a light leakage of a CLC layer (e.g., the CLC layer 215) versus the ellipticity $\varepsilon$ of a light incident onto the CLC layer, according to an embodiment of the present disclosure. As shown in FIG. 2D, the horizontal axis is the ellipticity $\varepsilon$ of a light incident onto a CLC layer, and the vertical axis is the light leakage of the CLC layer, i.e., the light transmittance of the CLC layer. In some embodiments, the CLC layer may include LHCLCs. Curve 290 shows the light leakage at different ellipticities. As shown in the curve 290, when the incident light is an LHCP light ($\varepsilon$=−1), the light leakage of the CLC layer is measured to be about 3.4%. For an elliptically polarized incident light having an orientation angle $\Psi$ of about 80°, as the ellipticity $\varepsilon$ of the elliptically polarized incident light gradually increases from −1 to −0.9, the light leakage of the CLC layer gradually decreases to a minimum value, which is measured to be about 3%. As the ellipticity $\varepsilon$ of the elliptically polarized incident light further increases to −0.6, the light leakage of the CLC layer gradually increases to about 6%. The curve 290 indicates that the light leakage of the CLC layer is reduced by about 0.4% when the ellipticity $\varepsilon$ of the incident light increases from −1 to −0.9. That is, the light leakage of the CLC layer including LHCLCs (referred to as an LHCLC layer) reaches a minimum value when the incident light is configured as a left-handed elliptically polarized light ($\varepsilon$=−0.9) rather than left-handed circularly polarized light ($\varepsilon$=−1).

Referring to FIG. 2C and FIG. 2D, in some embodiments, a minimum light transmittance of the LHCLC layer (e.g., the CLC layer 215) for an LHEP incident light with one or more of the predetermined orientation angle $\Psi$ and ellipticity $\varepsilon$ may be reduced by at least 0.4% as compared to a minimum light transmittance of the LHCLC layer for an LHCP light. In some embodiments, a minimum light transmittance of the LHCLC layer for an LHEP incident light with one or more of the predetermined orientation angle $\Psi$ and ellipticity $\varepsilon$ may be reduced by at least 0.1% as compared to a minimum light transmittance of the LHCLC layer for an LHCP light. In some embodiments, a minimum light transmittance of the LHCLC layer for an LHEP incident light with one or more of the predetermined orientation angle $\Psi$ and ellipticity $\varepsilon$ may be reduced by at least 0.3% as compared to a minimum light transmittance of the LHCLC layer for an LHCP incident light. In some embodiments, a minimum light transmittance of the LHCLC layer for an LHEP incident light with one or more of the predetermined orientation angle $\Psi$ and ellipticity $\varepsilon$ may be reduced by at least 0.2% as compared to a minimum light transmittance of the LHCLC layer for an LHCP incident light. Although left-handed elliptically polarized incident light and left-handed circularly polarized light are used as examples in describing the embodiments of the present disclosure, the embodiments may be similarly implemented for right-handed elliptically polarized incident light and the right-handed circularly polarized light.

Figure 3A:
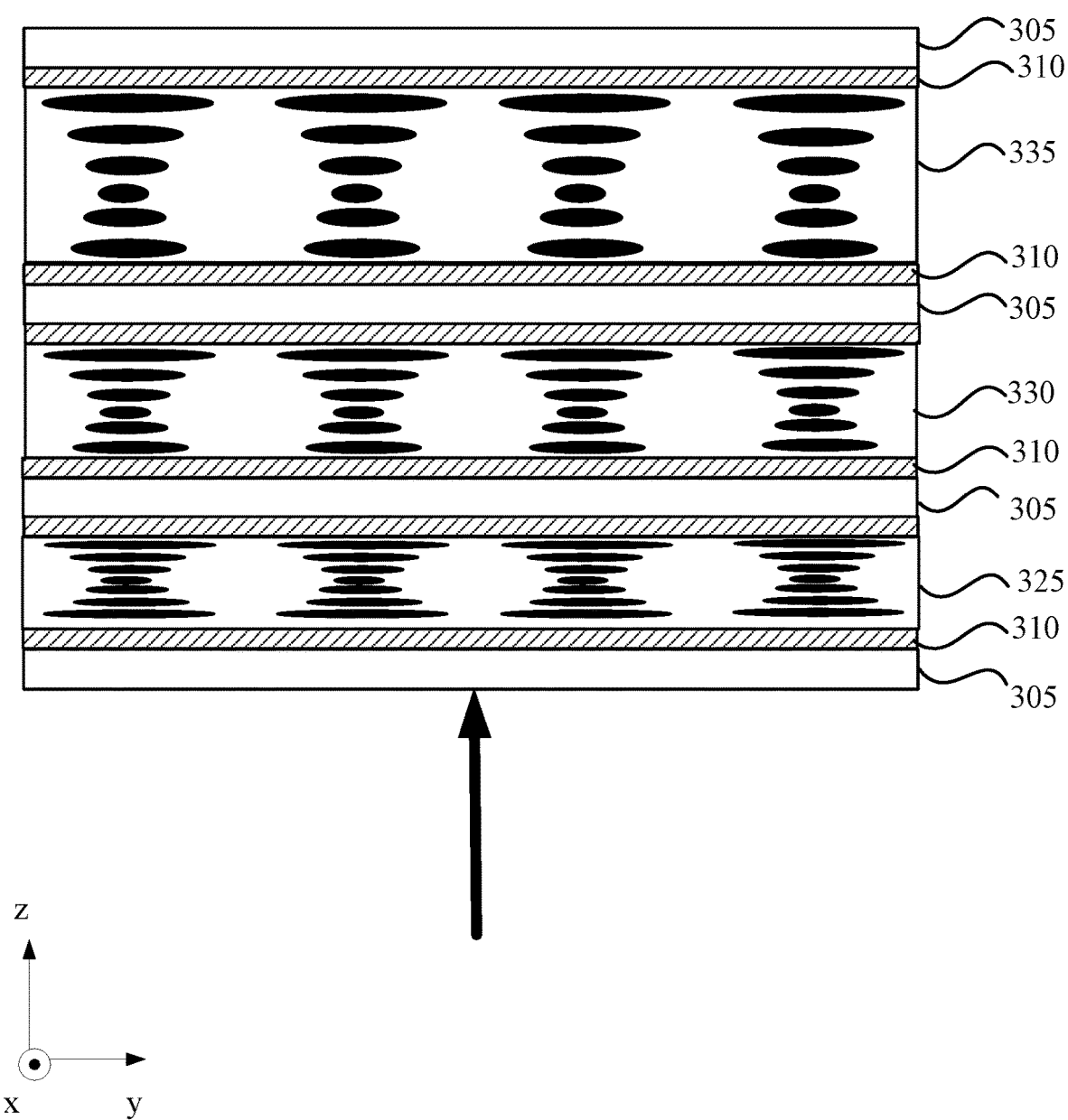
FIG. 3A illustrates a cross section of a CLC reflective polarizer, according to another embodiment of the present disclosure.

FIG. 3A illustrates a cross section of a CLC reflective polarizer 300, according to another embodiment of the present disclosure. The CLC reflective polarizer 300 shown in FIG. 3A may include elements that are similar to those included in the CLC reflective polarizer 200 shown in FIG. 2A. Detailed descriptions of the similar elements may refer to the above descriptions rendered in connection with FIG. 2A. As shown in FIG. 3A, the CLC reflective polarizer 300 may include a plurality of layers of birefringent materials (e.g., a plurality of single-pitch CLC layers) stacked together, where each CLC layer may have a helical structure with a constant helix pitch. The helix pitches may vary from layer to layer (e.g., at least two helix pitches of the plurality of single-pitch CLC layers may be different). The CLC layers may have narrow reflection bandwidths and may be optically coupled to corresponding narrowband (e.g., 30-nm bandwidth) light sources emitting lights in different colors (e.g., different wavelengths). In some embodiments, the reflection bands of the CLC layers may not overlap with each other. In some embodiments, the reflection bands of the CLC layers may overlap (e.g., slightly overlap) with each other, such that an overall reflection band of the CLC reflective polarizer 300 may be continuous and broad.

In some embodiments, each CLC layer may be disposed between two substrates 305. One or more alignment layers 310 may be disposed at one or more sides of each CLC layer, between the CLC layer and a substrate. In some embodiments, each CLC layer may be coupled with at least one substrate 305. In some embodiments, two adjacent CLC layers may be coupled with the same substrate 305 disposed between the two adjacent CLC layers, as FIG. 3A shows. For illustrative purposes, FIG. 3A shows that the CLC reflective polarizer 300 includes three CLC layers 325, 330, and 335. At least one of the three CLC layers 325, 330, and 335 (e.g., one, two, or three) may include a helical structure having a constant helix pitch (e.g., the helix pitches in the helical structure may be the same). For example, in some embodiments, each of the three CLC layers 325, 330, and 335 may include a helical structure having a constant helix pitch (e.g., the helix pitches in the helical structure may be the same).

In some embodiments, the helix pitches of the helical structure of at least one of the CLC layers 325, 330, and 335 may be different, e.g., gradually increasing or decreasing from one side of the CLC reflective polarizer 300 to another side. In some embodiments, the CLC layers 325, 330, and 335 may have narrow reflection bandwidths. In some embodiments, one or more of the CLC layers 325, 330, and 335 may be coupled to one or more corresponding narrowband (e.g., 30-nm bandwidth) light sources configured to emit lights in different colors (e.g., different wavelengths). For example, in some embodiments, the CLC layers 325, 330, and 335 may have a reflection band in the wavelength ranges of blue, green, and red lights, respectively. In some embodiments, the CLC layers 325, 330, and 335 may be coupled to narrowband blue, green, and red light sources having a central wavelength of about 450 nm, 530 nm, and 630 nm, respectively. The stack configuration of the three CLC layers 325, 330, and 335 as shown in FIG. 3A is for illustration only. Other suitable configurations may be used. In addition, the number of CLC layers is not limited to three. Any suitable number of CLC layers may be used.

A CLC layer may reflect a shorter wavelength as the incidence angle of the light increases. This phenomenon may be referred to as blue shift. In addition, due to the waveplate effect of the CLCs included in the CLC layer, when a circularly polarized light having the same handedness as that of the CLC layer is incident onto the CLC layer, the polarization state of the transmitted light may be changed to an elliptical polarization. This phenomenon may be referred to as depolarization. Depolarization of the transmitted light may result in a light leakage of the CLC layer, which may degrade the extinction ratio of the CLC reflective polarizer. The light leakage may increase as the incidence angle increases. In addition, when a plurality of single-pitch CLC layers are stacked to realize a broad reflection band, the depolarization of the transmitted light caused by a CLC layer may result in a lower reflectivity when the transmitted light is incident onto a subsequent CLC layer. In view of the blue shift and depolarization effect of the CLC layers, to achieve an optical compensation at oblique incidence angles and to achieve a broad reflection band, a CLC reflective polarizer consistent with the disclosed embodiments may include a plurality of single-pitch CLC layers and one or more compensation films arranged in a predetermined order.

Figure 3B:
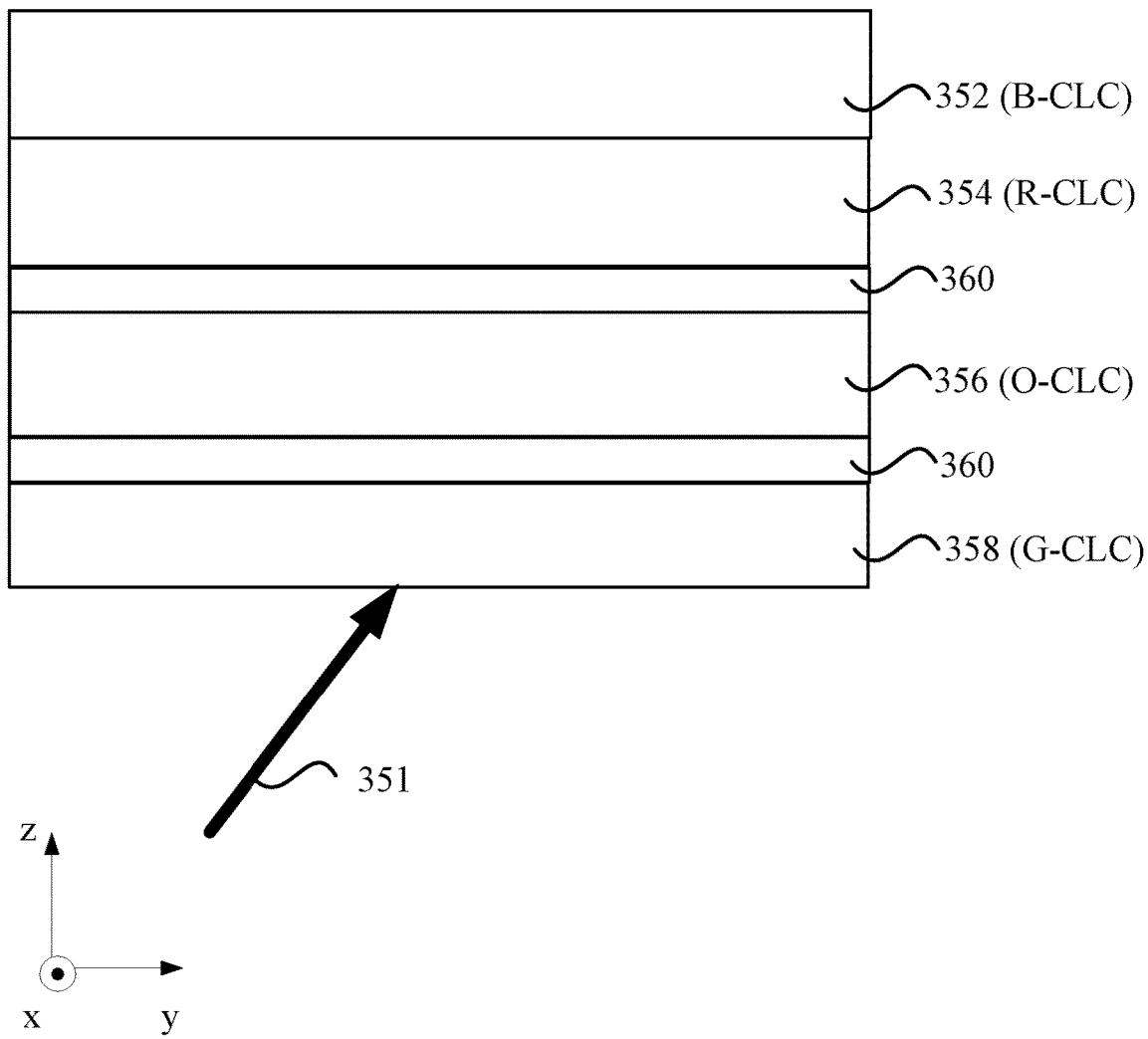
FIG. 3B illustrates a cross section of a CLC reflective polarizer, according to another embodiment of the present disclosure.

FIG. 3B illustrates a cross section of a CLC reflective polarizer 350, according to another embodiment of the present disclosure. The CLC reflective polarizer 350 may include elements similar to those included in the CLC reflective polarizer 300 shown in FIG. 3A. Description of the similar elements may refer to the above descriptions rendered in connection with FIG. 3A. As shown in FIG. 3B, the CLC reflective polarizer 350 may include a plurality of single-pitch CLC layers and one or more compensation films arranged in a predetermined order. To achieve a reflection band covering the entire visible wavelength range, the CLC reflective polarizer 350 may include a plurality of single-pitch CLC layers, each configured for a specific wavelength. For example, in the embodiment shown in FIG. 3B, the CLC reflective polarizer 350 may include four single-pitch CLC layers: a first CLC layer 352 having a reflection band in the wavelength range of blue lights (referred to as a "B-CLC" layer 352), a second CLC layer 354 having a reflection band in the wavelength range of red lights (referred to as an "R-CLC" layer 354), a third CLC layer 356 having a reflection band in the wavelength range of orange lights (referred to as an "O-CLC" layer 356) and a fourth CLC layer 358 having a reflection band in the wavelength range of green lights (referred to as a "G-CLC" layer 358). To achieve an optical compensation at oblique incidence angles, the CLC reflective polarizer 350 may further include two or more compensation films. The compensation film may be any suitable optical film, such as a positive C-plate. For illustrative purposes, in the embodiment shown in FIG. 3B, the CLC reflective polarizer 350 includes two compensation films: a first positive C-plate 360 disposed between the O-CLC layer 356 and the G-CLC layer 358, and a second positive C-plate 360 disposed between the O-CLC layer 356 and the R-CLC layer 354. An off-axis light 351 (e.g., a light that is not normally incident onto the CLC reflective polarizer 350) may be incident on the CLC reflective polarizer 350 from the G-CLC layer 358 side. In some embodiments, CLC layers 352, 354, 356, and 358 may also serve or function as negative C-plates. The positive C-plate property of the compensation films (e.g., positive C-plates 360) may compensate for the negative C-plate property of the CLC layers 352, 354, 356, and 358. In some embodiments, the positive C-plate 360 may be a retardation film having a substantially zero in-plane retardance and a positive thickness-direction retardance. The positive C-plate 360 may include an optical axis aligned perpendicular to the plane of the positive C-plate. An elliptically polarized light output from a CLC layer may be transformed into a circularly polarized light after passing through the positive C-plate. Through respectively configuring the thickness-direction retardances of the two positive C-plates 360, the depolarization of the transmitted light may be compensated for, and the light leakage of the CLC reflective polarizer 350 for off-axis incident lights may be reduced.

The stack configuration and the number of the CLC layers and positive C-plates shown in FIG. 3B are for illustration only. Other suitable arrangements or suitable number (e.g., three or more than four) of CLC layers may also be used. For example, in some embodiments, the CLC reflective polarizer 350 may include the B-CLC layer 352, the R-CLC layer 354, and the G-CLC layer 358, and may not include the O-CLC layer 356. In some embodiments, one or more additional CLC-layers for other colors may be added, such as a yellow-CLC layer, a purple-CLC layer, etc. In addition, the number of the positive C-plates may also be any suitable number, such as one, three, four, etc. For example, in some embodiments, the CLC reflective polarizer 350 may further include a positive C-plate 360 disposed between the B-CLC layer 352 and the R-CLC layer 354 in addition to the positive C-plate 360 disposed between the O-CLC layer 356 and the G-CLC layer 358 and the positive C-plate 360 disposed between the O-CLC layer 356 and the R-CLC layer 354. In some embodiments, the CLC reflective polarizer 350 may include a positive C-plate 360 disposed between the B-CLC layer 352 and the R-CLC layer 354, and a positive C-plate 360 disposed between the O-CLC layer 356 and the G-CLC layer 358, with no positive C-plate disposed between the R-CLC layer 354 and the O-CLC layer 356. In some embodiments, the CLC reflective polarizer 350 may include a positive C-plate 360 disposed between the B-CLC layer 352 and the R-CLC layer 354, and a positive C-plate 360 disposed between the O-CLC layer 356 and the R-CLC layer 354, with no positive C-plate disposed between the O-CLC layer 356 and the G-CLC layer 358. In some embodiments, the order of the different CLC layers may be different from the order shown in FIG. 3B. Any other suitable order for the stacked CLC layers may be used.

Figure 3C:
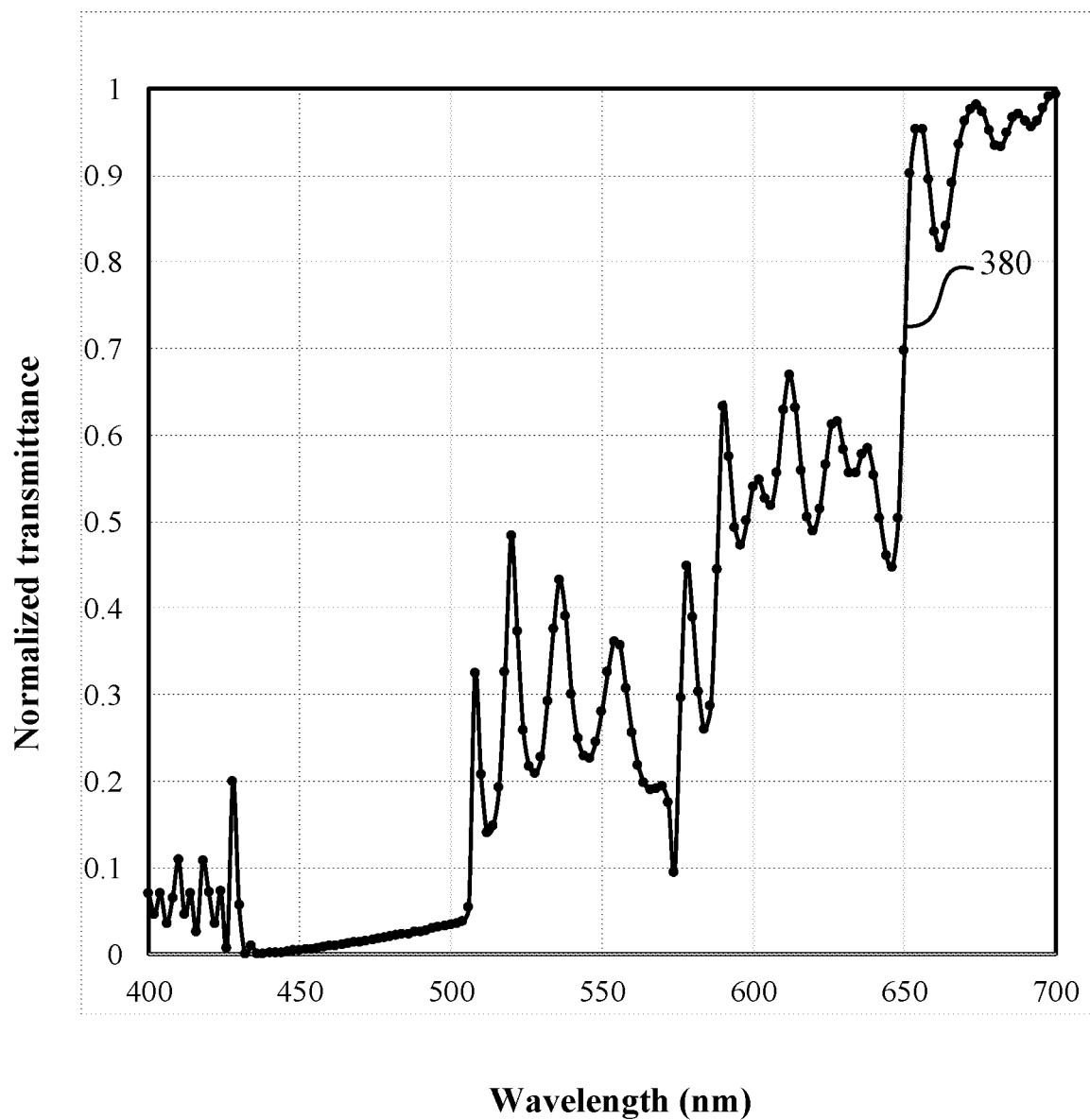
FIG. 3C illustrates simulation results showing off-axis incidence angle light leakage of a conventional CLC reflective polarizer that does not include a positive C-plate.
Figure 3D:
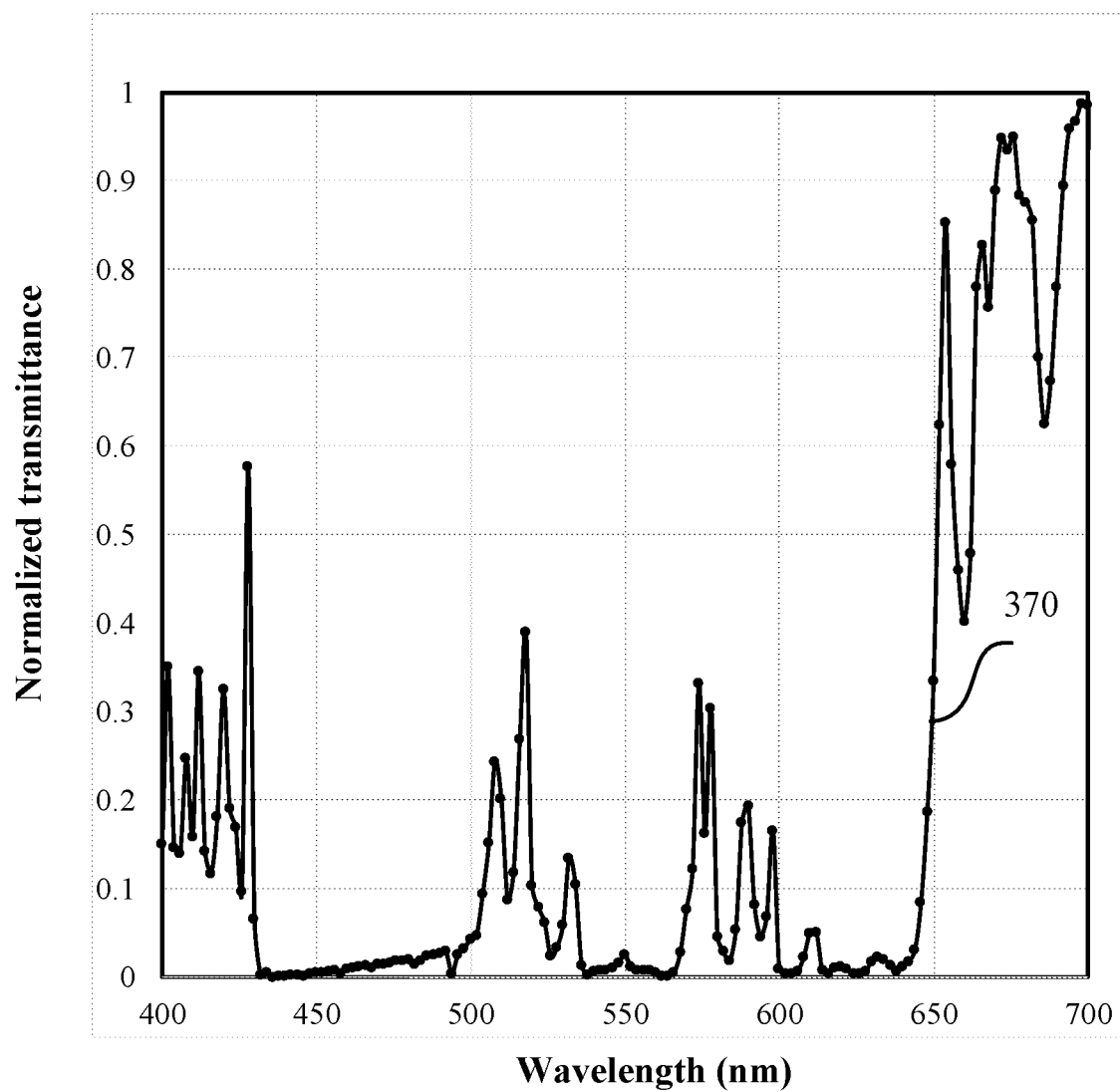
FIG. 3D illustrates simulation results showing off-axis incidence angle light leakage of a CLC reflective polarizer with two positive C-plates, according to an embodiment of the present disclosure.

FIG. 3C illustrates simulation results showing off-axis incidence angle light leakage of a conventional CLC reflective polarizer that does not include a positive C-plate. FIG. 3D illustrates simulation results showing off-axis incidence angle light leakage of the CLC reflective polarizer 350 shown in FIG. 3B that includes two positive C-plates. In each plot shown in FIG. 3C and FIG. 3D, the horizontal axis is the incidence wavelength (unit: nm), and the vertical axis is the normalized light intensity of the transmitted light as represented by the Strokes parameter S0, i.e., the light leakage of a CLC reflective polarizer. Curve 370 shows the light leakage of the CLC reflective polarizer 350 shown in FIG. 3B, in which two positive C-plates are included. Curve 380 shows the light leakage of a CLC reflective polarizer having a B-CLC layer, an R-CLC layer, an O-CLC layer, and a G-CLC layer (similar to those shown in FIG. 3B) with no positive C-plate disposed between the CLC layers. The light leakage of the two CLC reflective polarizers is evaluated for a 40° incidence angle (an example of an off-axis incidence angle). As shown in curve 380, the light leakage of the CLC reflective polarizer without a positive C-plate is substantially zero merely in the blue wavelength range, e.g., from 440 nm to 500 nm. In other wavelength ranges, e.g., from 500 nm to 640 nm, the light leakage is consistently large. In comparison, as shown in curve 370, in addition to the blue wavelength range (e.g., from 440 nm to 500 nm), the light leakage of the CLC reflective polarizer 350 with two positive C-plates is also substantially zero in other wavelength ranges, such as the green wavelength range (e.g., from 530 nm to 560 nm) and the red wavelength range (e.g., from 600 nm to 640 nm).

Figure 4:
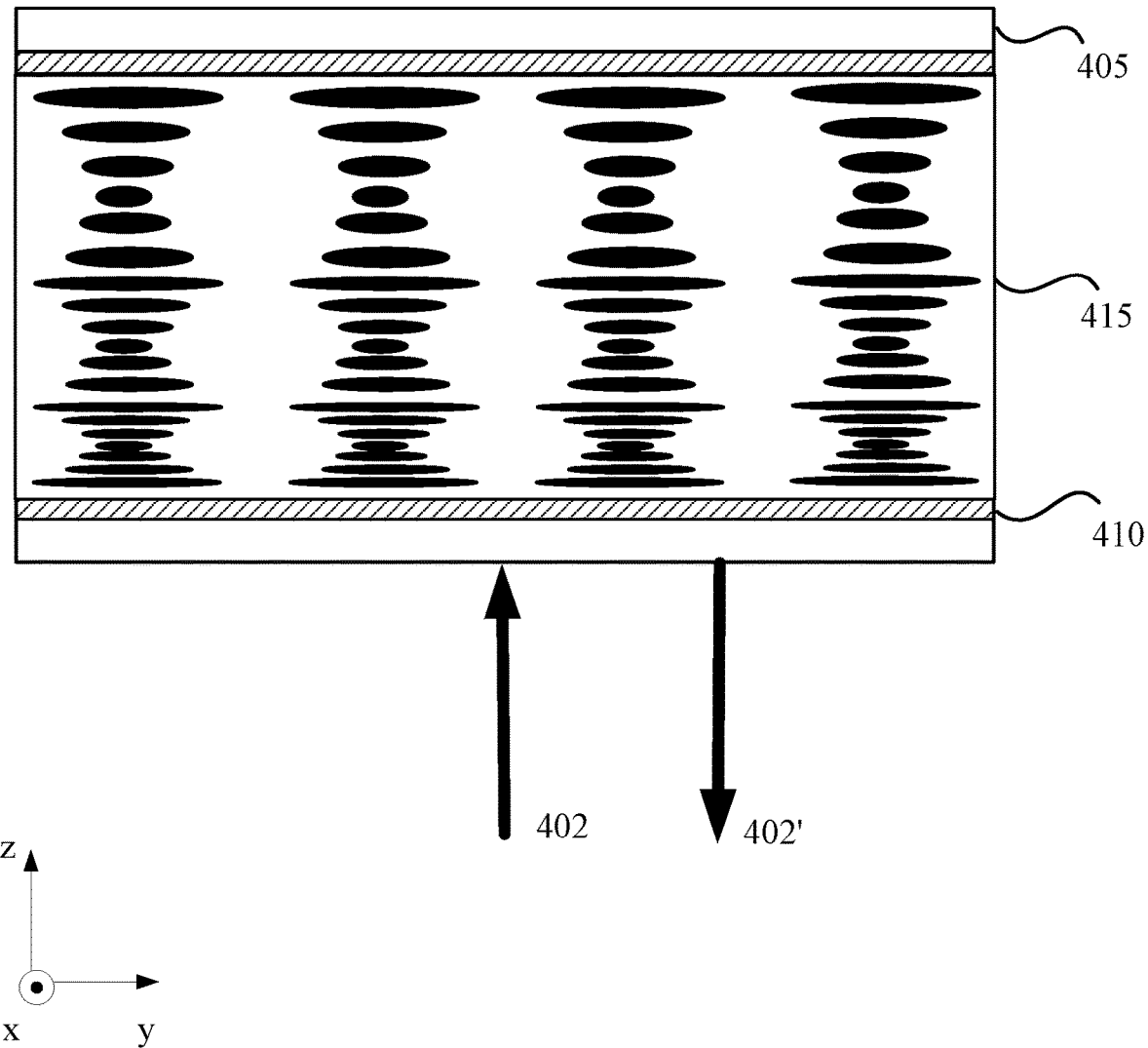
FIG. 4 illustrates a cross section of a CLC reflective polarizer, according to another embodiment of the present disclosure.

FIG. 4 illustrates a cross section of a CLC reflective polarizer 400, according to another embodiment of the present disclosure. The CLC reflective polarizer 400 may include elements that are similar to those included in the CLC reflective polarizer 200 shown in FIG. 2A. Descriptions of the similar elements may refer to the above descriptions rendered in connection with FIG. 2A. As shown in FIG. 4, the CLC reflective polarizer 400 may include a CLC layer 415 having a helical structure of a varying (e.g., non-constant) helix pitch (e.g., a gradient helix pitch). In some embodiments, the helix pitch may gradually increase or decrease in a predetermined direction (e.g., in a thickness direction of the CLC layer 415). For illustrative purposes, in the embodiment shown in FIG. 4, the varying helix pitch is shown as gradually increasing along the thickness direction of the CLC layer 415, e.g., along the +z-axis direction as shown in FIG. 4. The varying helix pitch configuration may result in a broad reflection band for the CLC layer 415. In some embodiments, the CLC reflective polarizer 400 may be coupled to a broadband polychromatic light source (not shown), such as a 300-nm-bandwidth light source covering the visible wavelength range. For discussion purposes, the CLC reflective polarizer 400 is described as an LHCLC refractive polarizer having a 300-nm-bandwidth reflection band covering the visible wavelength range. In some embodiments, the CLC reflective polarizer 400 may be configured as an RHCLC reflective polarizer. A broadband LHCP light 402 may be substantially normally incident onto a shorter pitch side (e.g., the lower side shown in FIG. 4) of the CLC reflective polarizer 400. For discussion purposes, the broadband LHCP light 402 may include components of LHCP blue, green, and red lights having a central wavelength of about 450 nm, about 530 nm, and about 630 nm, respectively. When propagating substantially along the axial direction of the CLC layer 415, the components of LHCP blue, green, and red lights may be primarily or substantially reflected by the CLC layer 415 as an LHCP blue light, an LHCP green light, and an LHCP red light, respectively, which are subsequently combined to be visually observed as a broadband LHCP light 402'.

The CLC refractive polarizers and the features of the CLC refractive polarizers as described in various embodiments may be combined. For example, the varying (e.g., gradient) pitch CLC layer 415 shown in FIG. 4 may be coupled to one or more positive C-plates and an optical waveplate to reduce the light leakage at off-axis incidence angles and at an on-axis incidence angle. In some embodiments, the stack of single-pitch CLC layers shown in FIG. 3A and FIG. 3B may be coupled to an optical waveplate to reduce the light leakage at an on-axis incidence angle.

CLC reflective polarizers in accordance with an embodiment of the present disclosure may have various applications in a number of fields, which are all within the scope of the present disclosure. Some exemplary applications in augmented reality ("AR"), virtual reality ("VR"), mixed reality ("MR") fields or some combinations thereof will be explained below. Near-eye displays ("NEDs") have been widely used in a large variety of applications, such as aviation, engineering, science, medicine, computer gaming, video, sports, training, and simulations. One application of NEDs is to realize VR, AR, MR or some combination thereof. Desirable characteristics of NEDs include compactness, light weight, high resolution, large field of view ("FOV"), and small form factor. An NED may include a display element configured to generate an image light and a lens system configured to direct the image light toward eyes of a user. The lens system may include a plurality of optical elements, such as lenses, waveplates, reflectors, etc., for focusing the image light to the eyes of the user. To achieve a compact size and light weight and to maintain satisfactory optical characteristics, an NED may adopt a pancake lens assembly in the lens system to fold the optical path, thereby reducing a back focal distance in the NED.

Figure 5A:
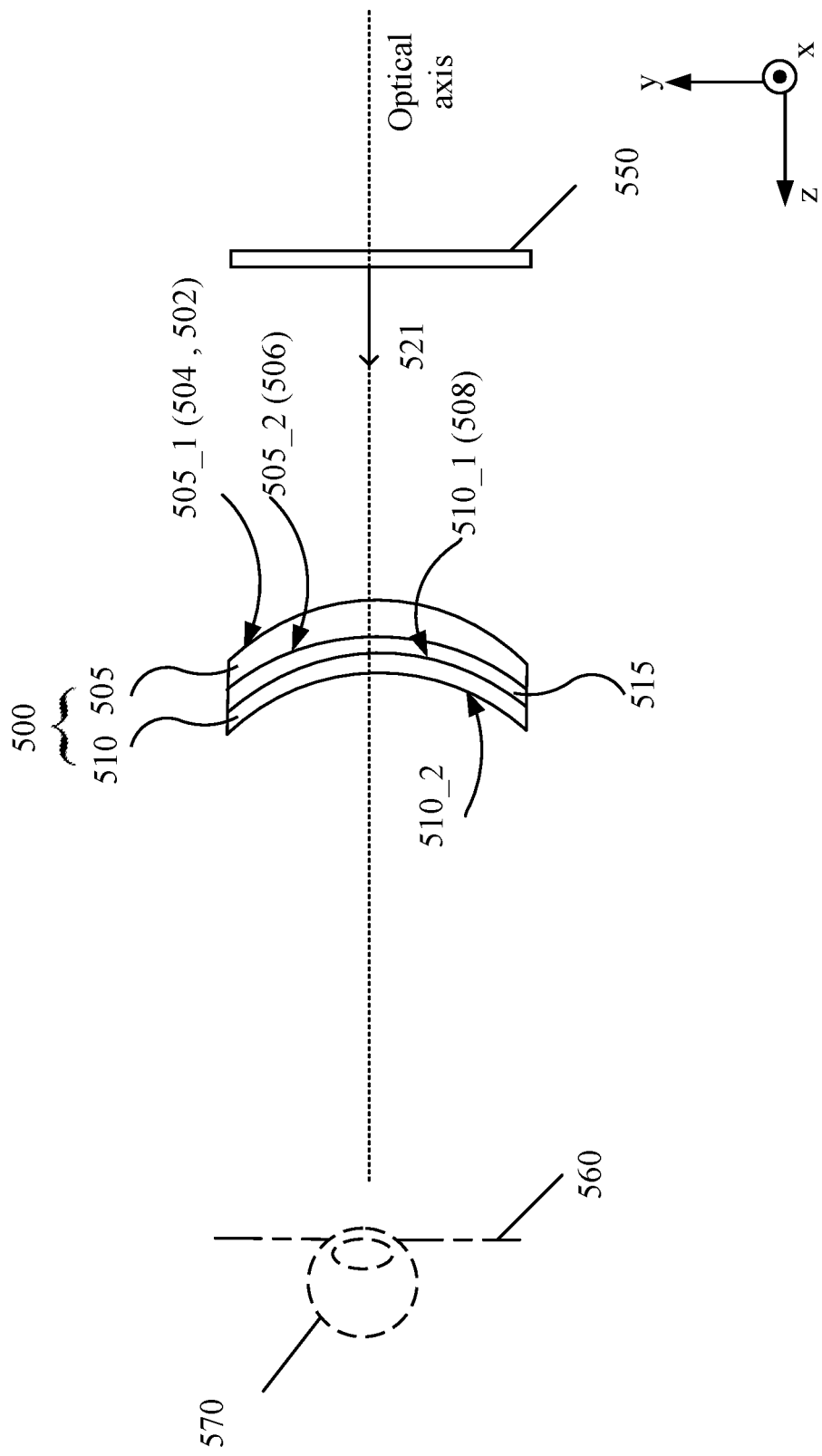
FIG. 5A illustrates a schematic diagram of a pancake lens assembly, according to an embodiment of the present disclosure.

FIG. 5A illustrates a schematic diagram of a pancake lens assembly 500 according to an embodiment of the present disclosure. The pancake lens assembly 500 may be implemented in an NED to fold the optical path, thereby reducing the back focal distance in the NED. As shown in FIG. 5A, the pancake lens assembly 500 may focus a light 521 emitted from an electronic display 550 (which may be other suitable light source) to an eye-box located at an exit pupil 560. Hereinafter, the light 521 emitted by the electronic display 550 for forming images is also referred to as an "image light." The exit pupil 560 may be at a location where an eye 570 is positioned in an eye-box region when a user wears the NED. In some embodiments, the electronic display 550 may be a monochromatic display that includes a narrowband monochromatic light source (e.g., a 30-nm-bandwidth light source). In some embodiments, the electronic display 550 may be a polychromatic display (e.g., a red-green-blue ("RGB") display) that includes a broadband polychromatic light source (e.g., 300-nm-bandwidth light source covering the visible wavelength range). In some embodiments, the electronic display 550 may be a polychromatic display (e.g., an RGB display) created by stacking a plurality of monochromatic displays, which may include corresponding narrowband monochromatic light sources respectively.

In some embodiments, the pancake lens assembly 500 may include a first optical element 505 and a second optical element 510 coupled together to create, for example, a monolithic optical element. In some embodiments, one or more surfaces of the first optical element 505 and the second optical element 510 may be shaped to compensate for field curvature. In some embodiments, one or more surfaces of the first optical element 505 and/or the second optical element 510 may be shaped to be spherically concave (e.g., a portion of a sphere), spherically convex, a rotationally symmetric asphere, a freeform shape, or some other shape that can mitigate field curvature. In some embodiments, the shape of one or more surfaces of the first optical element 505 and/or the second optical element 510 may be designed to additionally compensate for other forms of optical aberration. In some embodiments, one or more of the optical elements within the pancake lens assembly 500 may have one or more coatings, such as an anti-reflective coating, to reduce ghost images and enhance contrast. In some embodiments, the first optical element 505 and the second optical element 510 may be coupled together by an adhesive 515. Each of the first optical element 505 and the second optical element 510 may include one or more optical lenses.

The first optical element 505 may include a first surface 505_1 configured to receive an image light from the electronic display 550 and an opposing second surface 505_2 configured to output an altered image light. The first optical element 505 may include a linear polarizer (or a linear polarizer surface) 502, a waveplate (or a waveplate surface) 504, and a mirror (or a mirrored surface) 506 arranged in optical series, each of which may be an individual layer or coating bonded to or formed at the first optical element 505. The linear polarizer 502, the waveplate 504, and the mirror 506 may be bonded to or formed on the first surface 505_1 or the second surface 505_2 of the first optical element 505. For discussion purposes, FIG. 5A shows that the linear polarizer 502 and the waveplate 504 are bonded to or formed at the first surface 505_1, and the mirror 506 is bonded to or formed at the second surface 505_2. In some embodiments, the mirror 506 may be a partial reflector that is configured to reflect a portion of a received light. In some embodiments, the mirror 506 may be configured to transmit about 50% and reflect about 50% of a received light, and may be referred to as a "50/50 mirror." In some embodiments, the handedness of the reflected light may be reversed, and the handedness of the transmitted light may remain unchanged.

The second optical element 510 may have a first surface 510_1 facing the first optical element 505 and an opposing second surface 510_2. The second optical element 510 may include a reflective polarizer 508 (or a reflective polarizer surface 508), which may be an individual layer or coating bonded to or formed at the second optical element 510. The reflective polarizer 508 may be bonded to or formed at the first surface 510_1 or the second surface 510_2 of the second optical element 510 and may receive a light output from the mirror 506. For discussion purposes, FIG. 5A shows that the reflective polarizer 508 is bonded to or formed at the first surface 510-1 of the second optical element 510. The reflective polarizer 508 may include a reflective polarizing film configured to primarily reflect a received light of a first polarization and primarily transmit a received light of a second polarization. The reflective polarizer 508 may be a CLC reflective polarizer in accordance with an embodiment of the present disclosure. For example, the reflective polarizer 508 may be any of the CLC reflective polarizer 200, 300, 350, or 400.

Referring to FIG. 5A, in some embodiments, the image light 521 emitted from the electronic display 550 may be unpolarized. The linear polarizer 502 may be configured to convert the unpolarized image light 521 into a linearly polarized light. A polarization axis (e.g., a fast axis) of the waveplate 504 may be orientated relative to the transmission axis of the linear polarizer 502 to convert the linearly polarized light into an elliptically polarized light having one or more predetermined polarization ellipse parameters toward the CLC reflective polarizer 508, such that the elliptically polarized light may be substantially reflected by the CLC reflective polarizer 508 with a reduced light leakage (e.g., a portion of the elliptically polarized light that is transmitted by the CLC reflective polarizer 508 may be reduced). In some embodiments, the one or more predetermined polarization ellipse parameters may include at least one of an orientation angle $\Psi$ or an ellipticity $\varepsilon$ described above in connection with FIG. 2B-FIG. 2D.

For example, the one or more predetermined polarization ellipse parameters may include both of the orientation angle $\Psi$ and the ellipticity $\varepsilon$ described above in connection with FIG. 2B-FIG. 2D. In some embodiments, the CLC reflective polarizer 508 may include LCs having a birefringence in a range of about 0.15 to about 0.4. To reduce the light leakage (e.g., to reduce the light transmittance) of the CLC reflective polarizer 508 for an elliptically polarized incident light having the same handedness as the helical structure of the CLC reflective polarizer 508, the orientation angle $\Psi$ of the elliptically polarized incident light may be configured to be a value in a range of about $75°\leq\Psi\leq90°$, about $75°\leq\Psi\leq85°$, about $75°\leq\Psi\leq80°$, about $80°\leq\Psi\leq90°$, about $80°\leq\Psi\leq85°$, about $85°\leq\Psi\leq90°$, about $76°\leq\Psi\leq89°$, about $77°\leq\Psi\leq88°$, about $78°\leq\Psi\leq87°$, or about $79°\leq\Psi\leq86°$. In some embodiments, the orientation angle $\Psi$ may be in a range of $n_1°\leq\Psi\leq n_2°$, where $n_1$ may be any suitable value equal to or greater than 75, and $n_2$ may be any suitable value equal to or less than 90 and greater than $n_1$. The ellipticity $\varepsilon$ of the elliptically polarized incident light may be configured to be a value in a range of about $-1<\varepsilon\leq-0.85$ when the CLC reflective polarizer 508 includes LHCLCs (referred to as an LHCLC reflective polarizer). For example, when the CLC reflective polarizer 508 is an LHCLC reflective polarizer, the ellipticity ε of the elliptically polarized incident light may be configured to be a value in a range of about $-0.95 \leq \varepsilon \leq -0.85$, about $-0.9 \leq \varepsilon \leq -0.85$, about $-0.95 \leq \varepsilon \leq -0.9$, about $-1 < \varepsilon \leq -0.9$, or about $-1 < \varepsilon \leq -0.95$. The ellipticity ε of the elliptically polarized incident light may be configured to be a value in a range of about $0.85 \leq \varepsilon < 1$ when the CLC reflective polarizer 508 includes RHCLCs (referred to an RHCLC reflective polarizer). For example, when the CLC reflective polarizer 508 is an RHCLC reflective polarizer, the ellipticity ε of the elliptically polarized incident light may be configured to be a value in a range of about $0.85 \leq \varepsilon \leq 0.95$, about $0.85 \leq \varepsilon \leq 0.9$, about $0.9 \leq \varepsilon \leq 0.95$, about $0.9 \leq \varepsilon < 1$, or about $0.95 \leq \varepsilon < 1$. With such configurations, ghost images caused by the light leakage of the CLC reflective polarizer 508 may be suppressed, and the optical performance of the pancake lens assembly 500 may be improved.

Figure 5B:
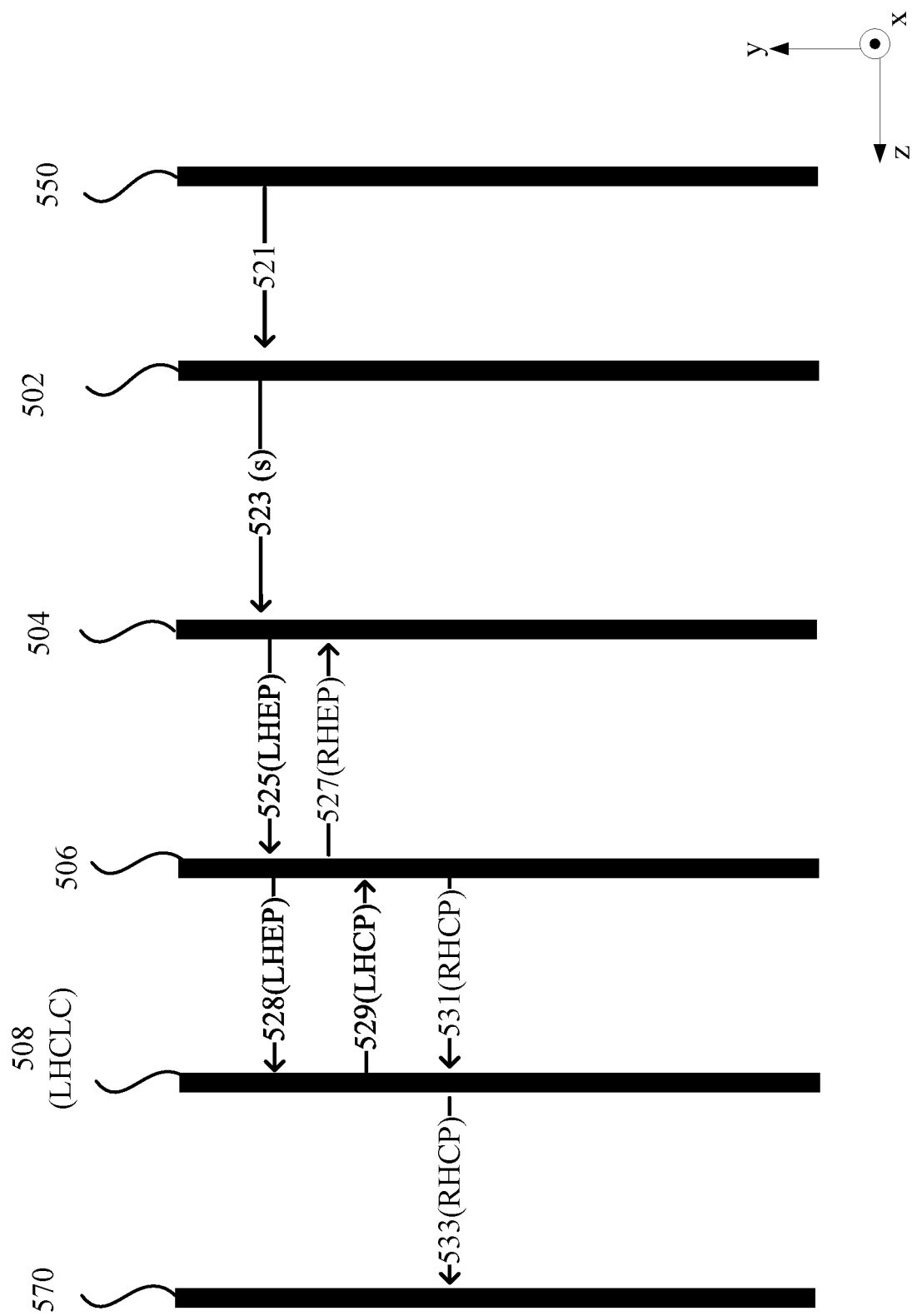
FIG. 5B schematically illustrates a cross-sectional view of an optical path of the pancake lens assembly shown in FIG. 5A, according to an embodiment of the present disclosure.

FIG. 5B illustrates a schematic cross-sectional view of an optical path of the pancake lens assembly 500 shown in FIG. 5A, according to an embodiment of the present disclosure. In FIG. 5B, the character "s" denotes that the corresponding light is s-polarized, RHCP and LHCP denote right-handed circularly polarized light and left-handed circularly polarized light, respectively, and RHEP and LHEP denote right-handed elliptically polarized light and left-handed elliptically polarized light, respectively. For discussion purposes, as shown in FIG. 5B, the linear polarizer 502 may be configured to transmit an s-polarized light and block a p-polarized light, and the reflective polarizer 508 may be a left-handed CLC ("LHCLC") reflective polarizer. For illustrative purposes, the electronic display 550, the linear polarizer 502, the waveplate 504, the mirror 506, and the reflective polarizer 508 are illustrated as flat surfaces in FIG. 5B. In some embodiments, one or more of the electronic display 550, the linear polarizer 502, the waveplate 504, the mirror 506, and the reflective polarizer 508 may include a curved surface.

As shown in FIG. 5B, the electronic display 550 may generate the unpolarized image light 521 covering a predetermined spectrum, such as a portion of the visible spectral range or the entire visible spectral range. The unpolarized image light 521 may be transmitted by the linear polarizer 502 as an s-polarized image light 523, which may be transmitted by the waveplate 504 as an LHEP light 525 having one or more predetermined polarization ellipse parameters (e.g., one or both of the orientation angle Ψ and the ellipticity ε being within predetermined ranges or at predetermined values). A first portion of the LHEP light 525 may be reflected by the mirror 506 as an RHCP light 527 toward the waveplate 504, and a second portion of the LHEP light 525 may be transmitted through the mirror 506 as an LHEP light 528 toward the CLC reflective polarizer 508.

The LHEP light 528 incident onto the CLC reflective polarizer 508 may have the same handedness (e.g., the left handedness) as that of the helical structure of the CLC reflective polarizer 508. As a result, the LHEP light 528 may be reflected by the CLC reflective polarizer 508 as an LHCP light 529 toward the mirror 506. The LHCP light 529 may be reflected by the mirror 506 as an RHCP light 531, which may be transmitted through the CLC reflective polarizer 508 as an RHCP light 533. The RHCP light 533 may be focused onto the eye 570.

Figure 6A:
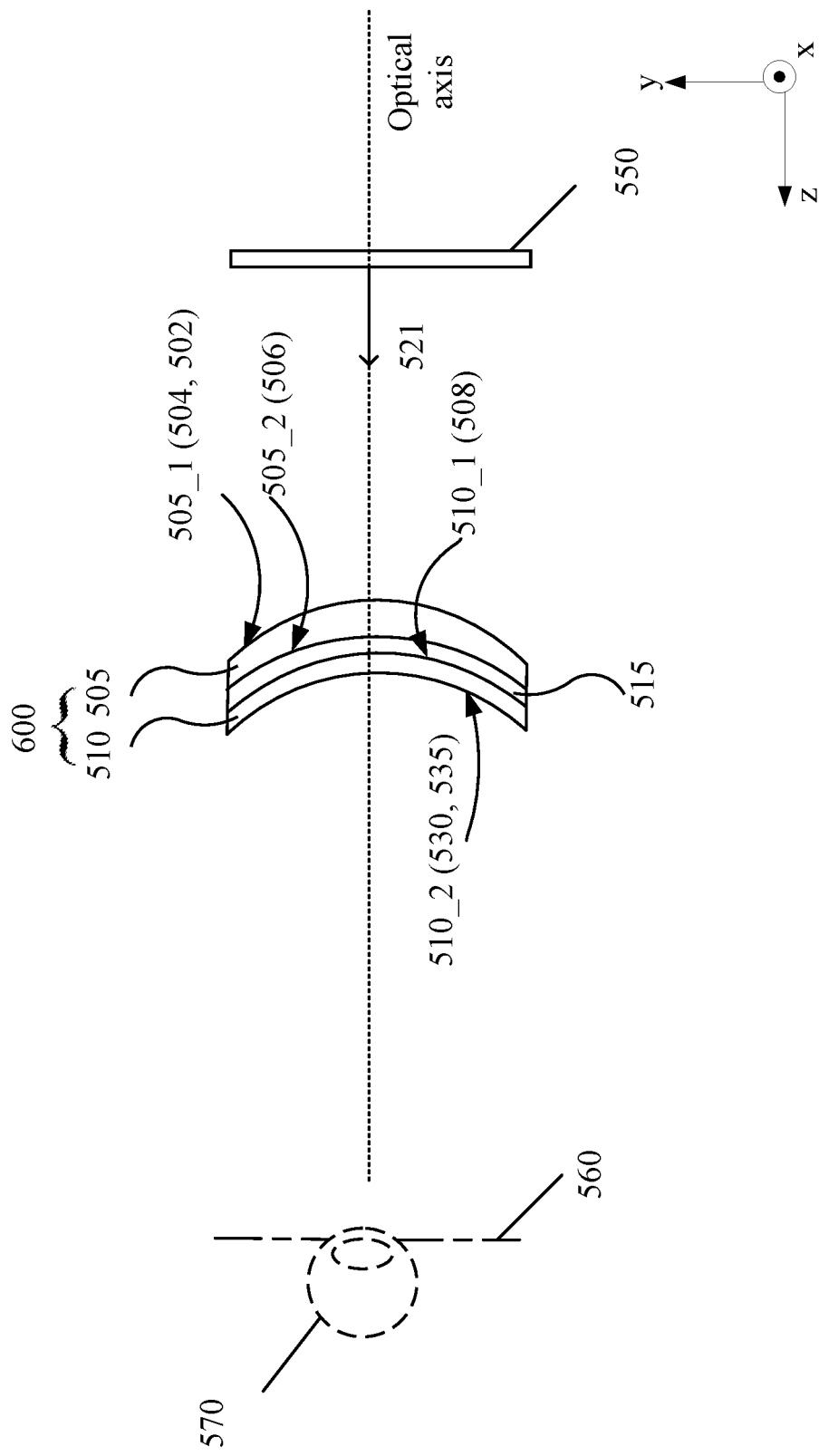
FIG. 6A illustrates a schematic diagram of a pancake lens assembly, according to another embodiment of the present disclosure.

In some embodiments, the linear polarizer 502 may be a first linear polarizer and the waveplate 504 may be a first waveplate, and the pancake lens assembly 500 may further include a second linear polarizer and a second waveplate arranged between the CLC reflective polarizer 508 and the eye 570 to enhance the performance of the pancake lens assembly 500. FIG. 6A illustrates a schematic diagram of a pancake lens assembly 600, according to another embodiment of the present disclosure. The pancake lens assembly 600 may include elements similar to those included in the pancake lens assembly 500 shown in FIG. 5A. Descriptions of the similar elements can refer to the above descriptions rendered in connection with FIG. 5A. As shown in FIG. 6A, the second optical element 510 may include a second waveplate (or a second waveplate surface) 535 and a second linear polarizer (or a second linear polarizer surface) 530 arranged in optical series, each of which may be an individual film or coating bonded to or formed at the first surface 510_1 or the second surface 510_2 of the second optical element 510. For discussion purposes, FIG. 6A shows that the second waveplate 535 and the second linear polarizer 530 are bonded to or formed at the second surface 510_2 of the second optical element 510.

The second waveplate 535 may receive a circularly polarized light from the reflective polarizer 508. The second linear polarizer 530 may be disposed between the second waveplate 535 and the eye 570. This configuration is better illustrated in FIG. 6B. In some embodiments, a polarization axis of the second waveplate 535 may be oriented relative to the transmission axis of the second linear polarizer 530 to convert a linearly polarized light into a circularly polarized light or vice versa for a visible spectrum and/or infrared spectrum. In some embodiments, for an achromatic design, the second waveplate 535 may include a multilayer birefringent material (e.g., a polymer or liquid crystals) to produce quarter wave birefringence across a wide spectral range. For example, an angle between the polarization axis (e.g., the fast axis) of the second waveplate 535 and the transmission axis of the second linear polarizer 530 may be configured to be in a range of 35-50 degrees. The combination of the second waveplate 535 and the second linear polarizer 530 may reduce the intensity of a ghost image caused by unpolarized image lights directly received from the electronic display 550. In addition, the combination of the second waveplate 535 and the second linear polarizer 530 may also function as an anti-narcissus film such that the user would not observe the image of the eye(s) of the user.

Figure 6B:
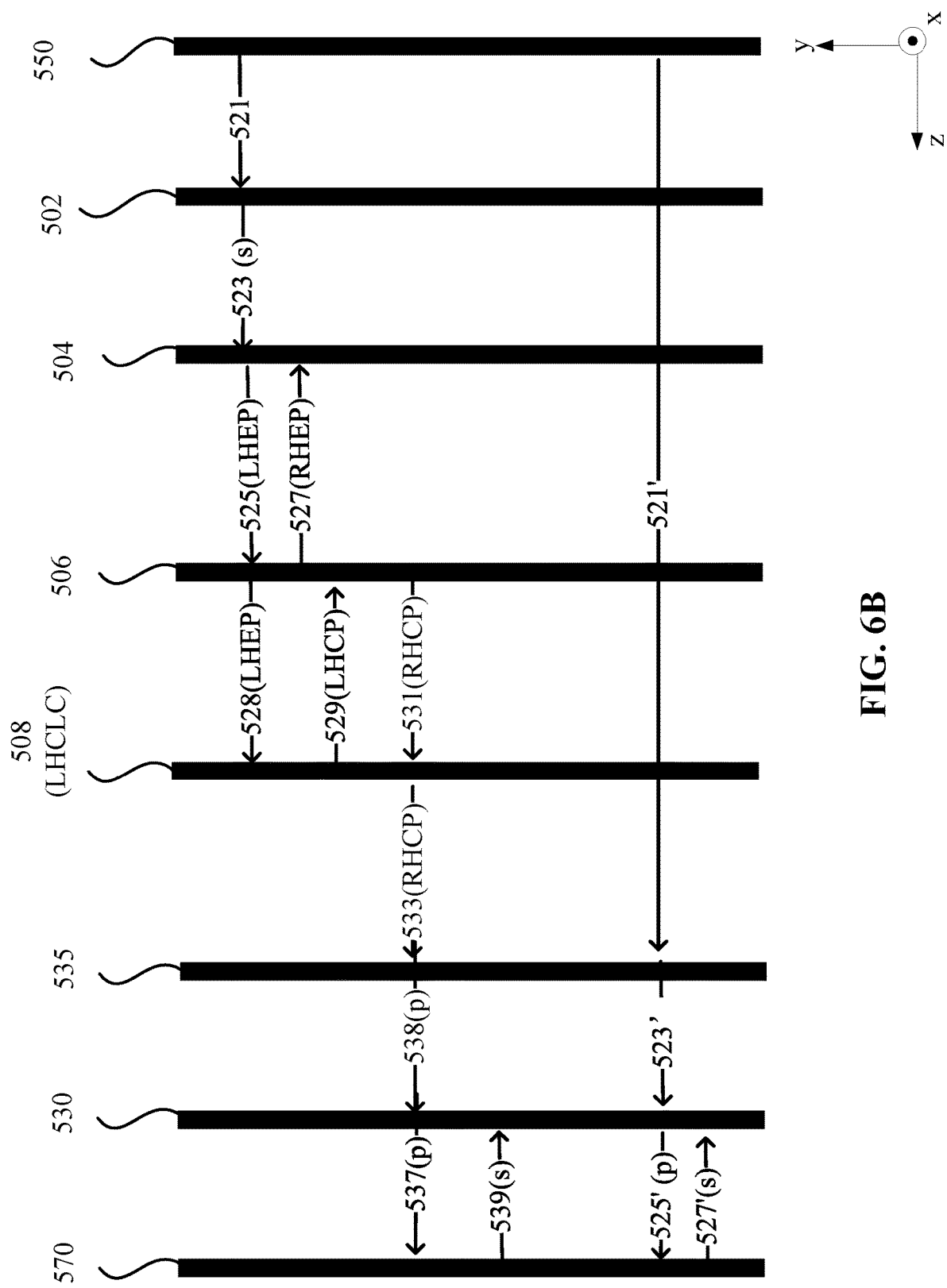
FIG. 6B schematically illustrates a cross-sectional view of an optical path of the pancake lens assembly shown in FIG. 6A, according to an embodiment of the present disclosure.

FIG. 6B illustrates a schematic cross-sectional view of an optical path of the pancake lens assembly 600 shown in FIG. 6A, according to an embodiment of the present disclosure. Certain elements shown in FIG. 6B are similar to or the same as those shown in FIG. 5B. Descriptions of such elements can refer to the above descriptions rendered in connection with FIG. 5B. In FIG. 6B, the character "p" denotes that the corresponding light is p-polarized. As shown in FIG. 6B, the optical path of the unpolarized image light 521 propagating from the electronic display 550 to the reflective polarizer 508 may be similar to that shown in FIG. 5B. As shown in FIG. 6B, the RHCP light 533 may be converted into a p-polarized light 538 by the second waveplate 535. The second linear polarizer 530 arranged between the second waveplate 535 and the eye 570 may be configured to transmit a p-polarized light and block an s-polarized light. Accordingly, the p-polarized light 538 may be transmitted by the second linear polarizer 530 as a p-polarized light 537 that may be focused onto the eye 570. In addition, an unpolarized image light 521' incident onto the second waveplate 535 directly from the electronic display 550 may be transmitted as an unpolarized light 523' toward the second linear polarizer 530. The unpolarized light 523' may be transmitted by the second linear polarizer 530 as a p-polarized light 525', thereby reducing the intensity of a ghost image caused by the image light 521' directly received from the electronic display 550.

The combination of the second waveplate 535 and the second linear polarizer 530 may also function as an anti-narcissus film. For example, as shown in FIG. 6B, the p-polarized light 537 and the p-polarized light 525' may be reflected by the eye 570 as an s-polarized light 539 and an s-polarized light 527' traveling in the −z-direction, respectively. As the second linear polarizer 530 may be configured to transmit a p-polarized light and block an s-polarized light, both the s-polarized light 539 and s-polarized light 527' may be blocked by the second linear polarizer 530. Accordingly, the narcissus may be suppressed, and the eye 570 of the user may not observe the image of the eye.

Referring to FIG. 5A and FIG. 6A, the electronic display 550 may be any suitable display. In some embodiments, the electronic display 550 may include a self-emissive panel, such as an organic light-emitting diode ("OLED") display panel, a micro light-emitting diode ("micro-LED") display panel, a quantum dot ("QD") display panel, or some combination thereof. In some embodiments, the electronic display 550 may include a non-emissive display, i.e., a display panel that is illuminated by an external illumination system, such as a liquid crystal display ("LCD") panel, a liquid-crystal-on-silicon ("LCoS") display panel, or a digital light processing ("DLP") display panel, or some combination thereof. The external illumination system may include a light source. Examples of light sources may include a laser, an LED, an OLED, or some combination thereof. The light sources may be narrowband or broadband. In some embodiments, the light source may emit an unpolarized image light.

Figure 7:
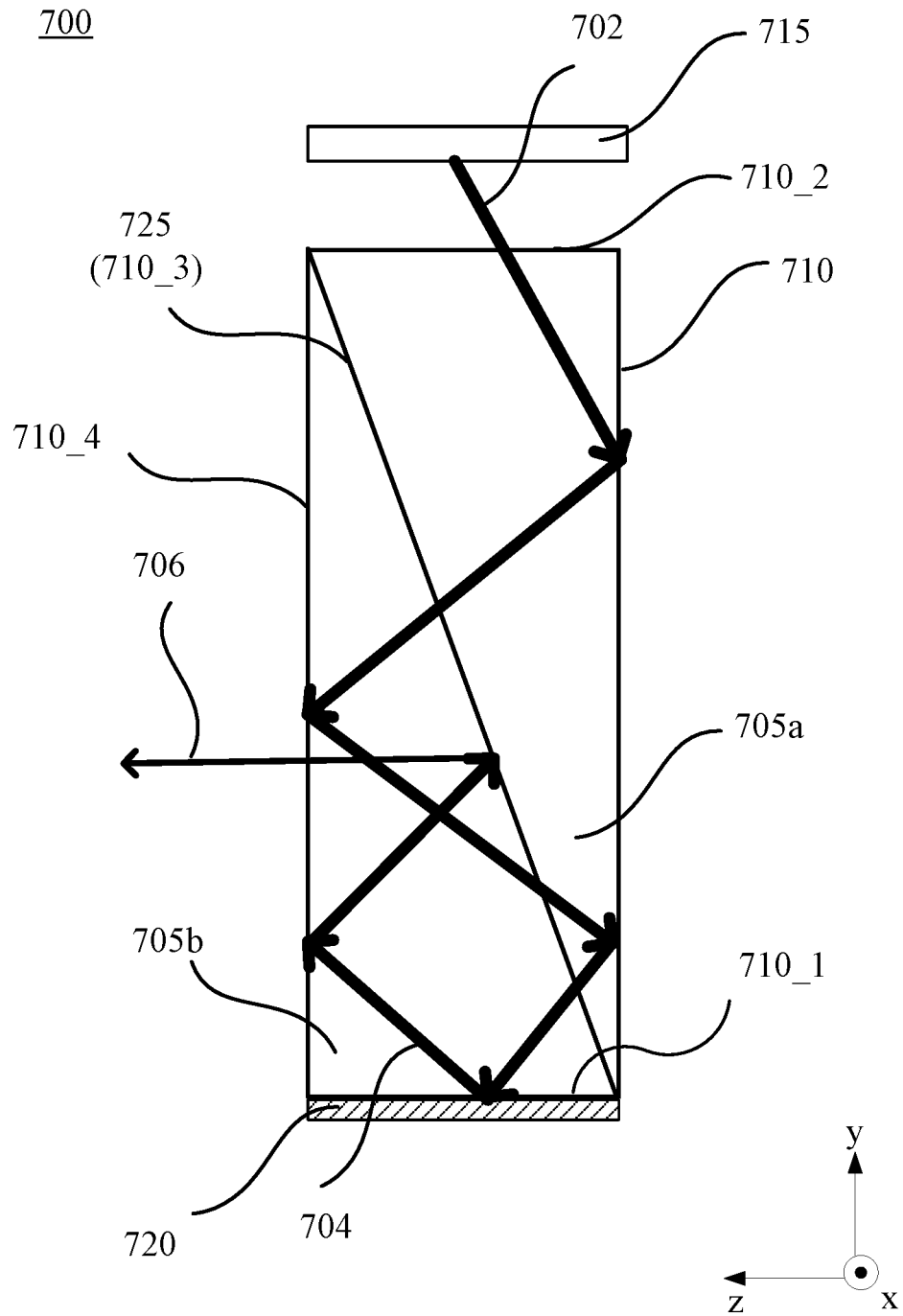
FIG. 7 illustrates a schematic diagram of an illumination system including a CLC reflective polarizer, according to an embodiment of the present disclosure.

The present disclosure further provides an illumination system including a CLC reflective polarizer. FIG. 7 illustrates a schematic diagram of an illumination system 700 including a CLC reflective polarizer, according to an embodiment of the present disclosure. The illumination system 700 may be configured to illuminate a display panel. As shown in FIG. 7, the illumination system 700 may include a planar light guide plate 710 formed by two or more wedges (e.g., a first wedge 705a and a second wedge 705b). For illustrative purposes, FIG. 7 shows two wedges 705a and 705b in the illumination system 700. Any other suitable number of wedges, such as three, four, five, six, etc., may be included in other embodiments of the illumination system 700. For example, at least one of the wedges 705a and 705b may be formed by two or more smaller wedges. In some embodiments, the illumination system 700 may include a reflective sheet 720 arranged or disposed at a first side surface 710_1 of the light guide plate 710. In some embodiments, as shown in FIG. 7, the reflective sheet 720 may be disposed external to the first side surface 710_1. In some embodiments, as shown in FIG. 7, the illumination system 700 may include a light source assembly 715 arranged or disposed at a second side surface 710_2 of the light guide plate 710. The first side surface 710_1 and the second side surface 710_2 may be located at opposite ends of the light guide plate 710. In some embodiments, the illumination system 700 may include a reflective polarizer 725 arranged at a slanted surface 710_3 of at least one of the two wedges 705a and 705b. In some embodiments, the slanted surface 710_3 may refer to a slanted surface of the first wedge 705a or a slanted surface of the second wedge 705b. The slanted surface of the first wedge 705a and the slanted surface of the second wedge 705b may fit with one another.

The light source assembly 715 may include a light source configure to emit a light and an optical assembly configured to conditioning the light. The light source may include one or more light-emitting diodes ("LEDs"), an electroluminescent panel ("ELP"), one or more cold cathode fluorescent lamps ("CCFLs"), one or more hot cathode fluorescent lamps ("HCFLs"), or one or more external electrode fluorescent lamps ("EEFLs"), etc. The LED light source may include a plurality of white LEDs or a plurality of RGB ("red, green, blue") LEDs, etc. The optical assembly may include one or more optical components configured to condition the light received from the light source. Conditioning the light emitted by the light source may include, e.g., transmitting, attenuating, expanding, collimating, adjusting orientation, and/or polarizing in accordance with instructions from a controller. The light output from the light source assembly 715 may be coupled into the light guide plate 710 at the second side surface 710_2 of the light guide plate 710. The side surface 710_2 may be referred to as a light incident surface of the light guide plate 710.

At least one of the wedges 705a and 705b may include an optically transparent material, such as an optically transparent acryl resin or the like. The light entering from the light incident surface (e.g., the second side surface 710_2) may propagate inside the light guide plate 710 via total internal reflection ("TIR"). The reflective polarizer 725 may be disposed at the slanted surface 710_3 of at least one of the two wedges 705a and 705b, where the two wedges 705a and 705b may be coupled to each other (e.g., in contact with each other) at their respective slanted surfaces to form the planar light guide plate 710. In some embodiments, the reflective polarizer 725 may be formed on, coated to, or otherwise provided via a suitable manner at the slanted surface of the first wedge 705a. In some embodiments, the reflective polarizer 725 may be formed on, coated to, or otherwise provided via a suitable manner at the slanted surface of the second wedge 705b. As shown in FIG. 7, the reflective polarizer 725 may be disposed between the slanted surface of the first wedge 705a and the slanted surface of the second wedge 705b. The reflective polarizer 725 may be configured to selectively transmit a light of a first polarization and reflect a light of a second polarization different from the first polarization. The reflective sheet 720 may be disposed at the first side surface 710_1 of the light guide plate 710, such that the light source assembly 715 and reflective sheet 720 may be disposed opposite to each other. The reflective sheet 720 may have a substantially high reflectivity (e.g., above 90%) and may convert a light of the second polarization into a light of the first polarization or vice versa when reflecting a received light.

In an operation, a first polarized light 702 emitted from the light source assembly 715 may have the first polarization. The first polarized light 702 may propagate inside the light guide plate 710 via TIR until arriving at the reflective sheet 720, where the first polarized light 702 may be reflected by the reflective sheet 720 as a second polarized light 704 having the second polarization. The second polarized light 704 may propagate inside the light guide plate 710 via TIR until arriving at the reflective polarizer 725. As the reflective polarizer 725 may be configured to selectively transmit a light of the first polarization and reflect a light of the second polarization, the second polarized light 704 having the second polarization may be reflected by the reflective polarizer 725 as a third polarized light 706 having the second polarization. The third polarized light 706 may be output from a light outputting surface 710_4 of the light guide plate 710 to illuminate display function materials, such as liquid crystals, in a display panel coupled to the illumination system 700.

FIG. 7 shows the light source assembly 715 spaced apart from the light guide plate 710 by a distance. This illustration is for illustrative purposes and is not intended to limit the scope of the present disclosure. In some embodiments, the light source assembly 715 may be directly coupled to the light guide plate 710 at the second side surface 710_2 of the light guide plate 710. In some embodiments, the illumination system 700 may include other elements, such as a diffuser sheet and/or a prism sheet arranged at the light outputting surface 710_4 of the light guide plate 710.

In some embodiments, the reflective polarizer 725 may be a CLC reflective polarizer in accordance with an embodiment of the present discourse, such as the CLC reflective polarizer 200 in FIG. 2A, the CLC reflective polarizer 300 in FIG. 3A, or the CLC reflective polarizer 400 in FIG. 4, etc. For example, the CLC reflective polarizer 725 may be an RHCLC reflective polarizer, which may be configured to primarily or substantially reflect a RHCP light and primarily or substantially transmit a LHCP light. The first polarized light 702 emitted from the light source assembly 715 may be an LHCP light, which may be transmitted by the CLC reflective polarizer 725 and may propagate inside the light guide plate 710 via TIR until arriving at the reflective sheet 720. The reflective sheet 720 may reflect the first LHCP light 702 as a second polarized light, i.e., an RHCP light 704, which may propagate inside the light guide plate 710 via TIR until arriving at the reflective polarizer 725. The RHCP light 704 may be reflected by the reflective polarizer 725 as a third polarized light, i.e., an RHCP light 706 that may be output at the light outputting surface 710_4 of the light guide plate 710 to illuminate display function materials, such as liquid crystals, in a display panel coupled to the illumination system 700.

Returning to FIG. 7, the structure of the CLC reflective polarizer 725 may be determined according to the characteristics of the light source assembly 715. The reflection band of the CLC reflective polarizer 725 may correspond to the wavelength of the light source assembly 715. For example, when the light source assembly 715 includes a narrowband monochromatic light source (e.g., a 30-nm-bandwidth light source), the CLC reflective polarizer 725 may be configured as a narrowband CLC reflective polarizer with a constant helix pitch. When the light source assembly 715 includes a broadband light source (e.g., a 300-nm-bandwidth light source covering the visible spectrum), the CLC reflective polarizer 725 may be configured as a broadband CLC reflective polarizer with a gradient helix pitch. When the light source assembly 715 includes a plurality of narrowband monochromatic light sources of different colors (e.g., narrowband blue, green, and red light sources), the CLC reflective polarizer 725 may be configured to include a plurality of CLC layers stacked together where the CLC layers may have at least two different helix pitches. In some embodiments, each CLC layer may have a different helix pitch.

Figure 8A:
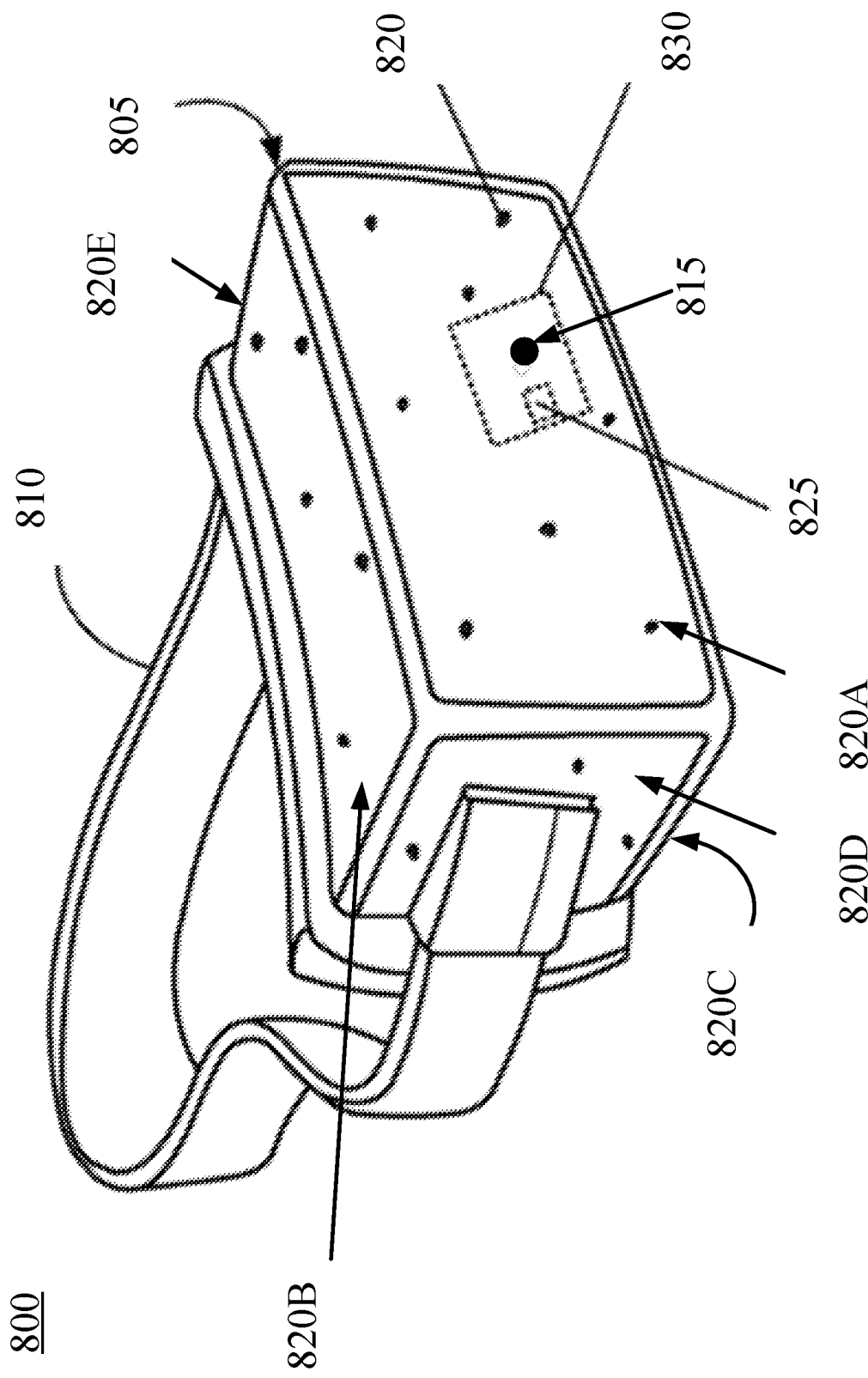
FIG. 8A illustrates a diagram of a near-eye display ("NED"), according to an embodiment of the present disclosure.

FIG. 8A illustrates a diagram of a near-eye display ("NED") 800, according to an embodiment of the present disclosure. As shown in FIG. 8A, the NED 800 may include a front body 805 and a band 810. The front body 805 may include one or more electronic display elements of an electronic display and one or more optical elements (not shown in detail in FIG. 8A), an inertial measurement unit ("IMU") 830, one or more position sensors 825, and one or more locators 820. In the embodiment shown in FIG. 8A, the one or more position sensors 825 may be located within the IMU 830. The locators 820 may be located at various positions on the front body 805 relative to a reference point 815. In the embodiment shown in FIG. 8A, the reference point 815 may be located at the center of the IMU 830, or at any other suitable location. The locators 820, or some of the locators 820, may be located on a front side 820A, a top side 820B, a bottom side 820C, a right side 820D, and a left side 820E of the front body 805.

Figure 8B:
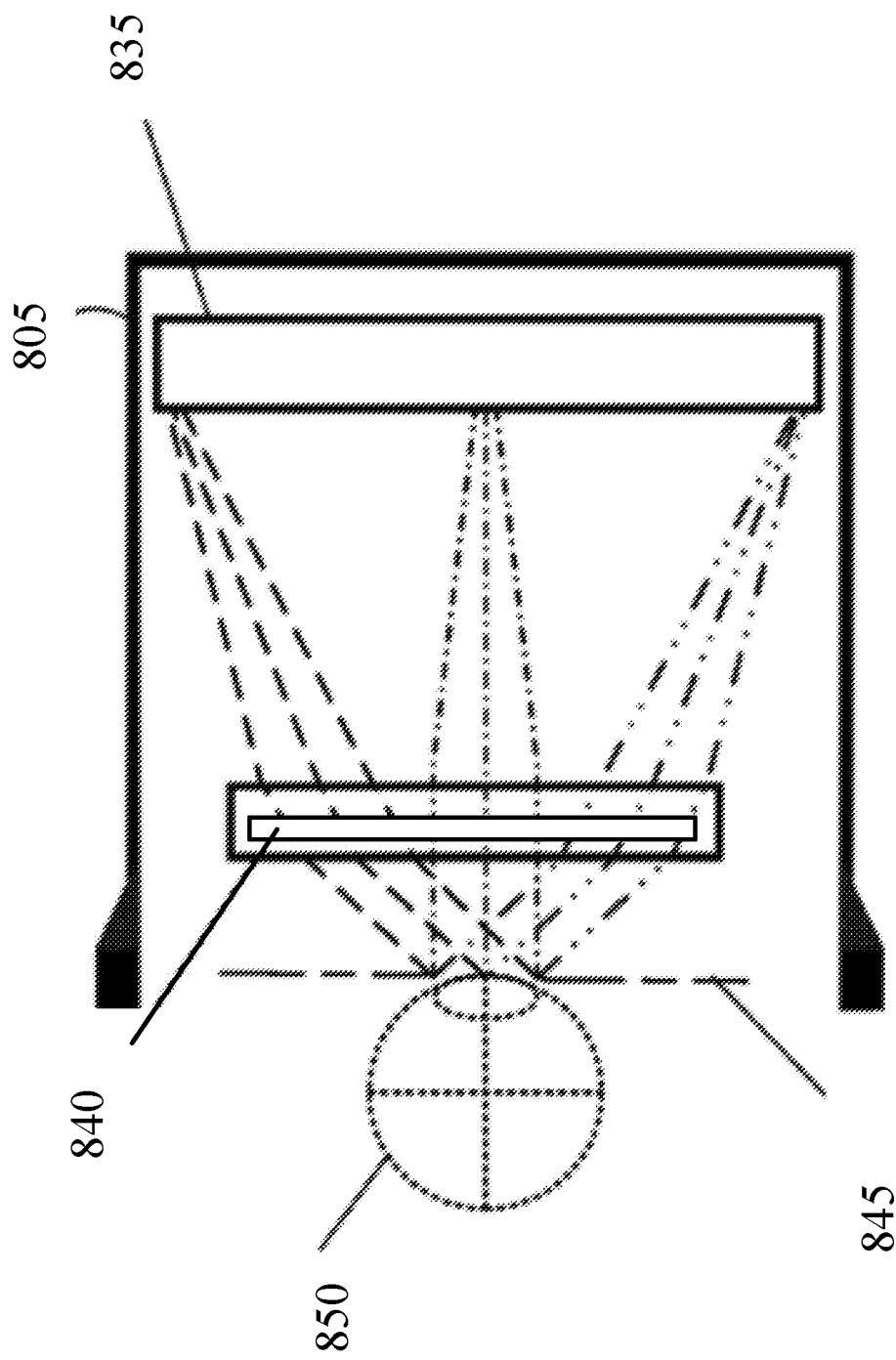
FIG. 8B illustrates a cross sectional view of a front body of the NED shown in FIG. 8A, according to an embodiment of the present disclosure.

FIG. 8B is a cross-sectional view of a front body of the NED 800 shown in FIG. 8A. As shown in FIG. 8B, the front body 805 may include an electronic display 835 and a pancake lens assembly 840 configured to provide altered image lights to an exit pupil 845. In some embodiments, the pancake lens assembly 840 may be a pancake lens assembly in accordance with an embodiment of the present disclosure, such as the pancake lens assembly 500 in FIG. 5A or the pancake lens assembly 600 in FIG. 6A. In some embodiments, the electronic display 835 may be an electronic display including a display panel and an illumination system in accordance with an embodiment of the present disclosure, such as the illumination system 700 in FIG. 7. The exit pupil 845 may be at a location of the front body 805 where an eye 850 of the user may be positioned. For illustrative purposes, FIG. 8B shows a cross-section of the front body 805 associated with a single eye 850, while another electronic display, separate from the electronic display 835, may provide image lights altered by another pancake lens assembly, separate from the pancake lens assembly 835, to another eye of the user.

The present disclosure also provides a method. The method relates to providing an incident light having one or more predetermined parameters to an optical element (e.g., a reflective polarizer) including a birefringent material with a chirality, such that the incident light may be substantially reflected by the optical element with a reduced (e.g., substantially zero) light transmittance. In some embodiments, the one or more predetermined parameters may include one or more predetermined polarization ellipse parameters, such as at least one of an ellipticity or an orientation angle. In some embodiments, providing the incident light having one or more predetermined parameters to the optical element including a birefringent material with a chirality may include, generating the incident light having the one or more predetermined parameters and outputting the incident light having the one or more predetermined parameters to the optical element. In some embodiments, providing the incident light having the one or more predetermined parameters to the optical element including a birefringent material with a chirality may include, converting a linearly polarized light into an elliptically polarized light having the one or more predetermined parameters (e.g., predetermined polarization ellipse parameters) and outputting the elliptically polarized light having the one or more predetermined parameters to the optical element. In some embodiments, providing the incident light having the one or more predetermined parameters to the optical element including a birefringent material with a chirality may include, converting a circularly polarized light into an elliptically polarized light having the one or more predetermined parameters (e.g., predetermined polarization ellipse parameters) and outputting the elliptically polarized light having the one or more predetermined parameters to the optical element. In some embodiments, providing the incident light having the one or more predetermined parameters to the optical element including a birefringent material with a chirality may include, converting an unpolarized light into an elliptically polarized light having the one or more predetermined parameters (e.g., predetermined polarization ellipse parameters) and outputting the elliptically polarized light having the one or more predetermined parameters to the optical element.

Any suitable devices (e.g., a waveplate, a light source assembly) may be used to provide the incident light having one or more predetermined parameters to an optical element including a birefringent material with a chirality. The method may also include receiving, by the optical element, the incident light having the one or more predetermined parameters and reflecting the incident light as a circularly polarized light. In some embodiments, the incident light may be an elliptically polarized light having the one or more predetermined polarization ellipse parameters. In some embodiments, the elliptically polarized light may be substantially reflected as the circularly polarized light with a reduced (e.g., substantially zero) light transmittance.

In some embodiments, the optical element including a birefringent material with a chirality may be a cholesteric liquid crystal ("CLC") reflective polarizer. In some embodiments, providing the incident light having the one or more predetermined polarization ellipse parameters may include, altering, by an optical waveplate disposed upstream of the CLC reflective polarizer, properties of the incident light such that the incident light have the one or more predetermined polarization ellipse parameters before the incident light is incident onto CLC reflective polarizer. For example, the optical waveplate may convert a linearly polarized light into an elliptically polarized light having the one or more predetermined polarization ellipse parameters, and output the elliptically polarized light to the CLC reflective polarizer. In some embodiments, providing the incident light having the one or more predetermined polarization ellipse parameters may include, generating, by a light source assembly, the incident light having the one or more predetermined polarization ellipse parameters, and outputting, by the light source assembly, the incident light having the one or more predetermined polarization ellipse parameters to the CLC reflective polarizer. In some embodiments, the light source assembly may directly generate and output an elliptically polarized light having the one or more predetermined polarization ellipse parameters as an incident light for the CLC reflective polarizer. In some embodiments, the light source assembly may include the optical waveplate. In some embodiments, the optical waveplate may be provided separately from the light source assembly. When the optical waveplate is provided separately from the light source assembly, in some embodiments, the light source assembly may output a linearly polarized light, and the optical waveplate may convert the linearly polarized light into an elliptically polarized light having the one or more predetermined polarization ellipse parameters, and output the elliptically polarized light to the CLC reflective polarizer. The CLC reflective polarizer may receive the incident light having the one or more predetermined parameters and reflect the incident light as a circularly polarized light with a reduced (e.g., substantially zero) light transmittance.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical device, comprising:
    a first optical element configured to output an elliptically polarized light; and
    a second optical element including a birefringent material with a chirality, and configured to receive the elliptically polarized light from the first optical element and reflect the elliptically polarized light as a circularly polarized light,
    wherein the first optical element is an optical waveplate, and
    wherein an ellipticity of the elliptically polarized light is in a range of greater than −1 and less than or equal to −0.85, or in a range of greater than or equal to 0.85 and less than 1.

2. The optical device of claim 1, wherein the second optical element is configured to transmit the elliptically polarized light at a light transmittance of substantially zero.

3. The optical device of claim 1, wherein the ellipticity of the elliptically polarized light is in the range of greater than −1 and less than or equal to −0.85 when the chirality of the birefringent material is left-handed, or in the range of greater than or equal to 0.85 and less than 1 when the chirality of the birefringent material is right-handed.

4. The optical device of claim 1, wherein:
the elliptically polarized light is represented by an ellipse having a semi-major axis of length a, and a semi-minor axis of length b, where a and b correspond to amplitudes of two orthogonal components of the elliptically polarized light, respectively,
the ellipticity of the elliptically polarized light is defined as $\varepsilon = b/a$,
an orientation angle $\Psi$ of the elliptically polarized light is an angle of the semi-major axis measured counter-clockwise from an alignment direction of the birefringent material in the second optical element, and
the orientation angle $\Psi$ is in a range of about 75 degrees $\leq \Psi \leq$ 90 degrees.

5. The optical device of claim 1, wherein a minimum light transmittance of the second optical element for the elliptically polarized light is reduced by at least 0.1%, at least 0.2%, at least 0.3%, at least 0.4%, or at least 0.5%, as compared to a minimum light transmittance of the second optical element for an incoming circularly polarized light, and wherein each of the elliptically polarized light and the incoming circularly polarized light has a handedness that is the same as the chirality of the birefringent material.

6. The optical device of claim 1, wherein an incident light of the first optical element is a linearly polarized light, the first optical element is a quarter-wave plate, and a polarization axis of the quarter-wave plate is oriented relative to a polarization direction of the linearly polarized light to convert the linearly polarized light into the elliptically polarized light.

7. An optical lens assembly, comprising:
a first optical element including an optical waveplate configured to convert an incident light into an elliptically polarized light, and a mirror configured to transmit a first portion of the elliptically polarized light and reflect a second portion of the elliptically polarized light; and
a second optical element including a reflective polarizer configured to receive the first portion of the elliptically polarized light from the mirror and reflect the first portion of the elliptically polarized light as a circularly polarized light having a first handedness toward the mirror,
wherein the reflective polarizer includes a birefringent material with a chirality.

8. The optical lens assembly of claim 7, wherein
the mirror is further configured to reflect the circularly polarized light having the first handedness as a circularly polarized light having a second handedness toward the reflective polarizer,
the reflective polarizer is further configured to transmit the circularly polarized light having the second handedness, and
the first handedness is opposite to the second handedness.

9. The optical lens assembly of claim 7, wherein the reflective polarizer is configured to transmit the elliptically polarized light at a light transmittance of substantially zero.

10. The optical lens assembly of claim 7, wherein the elliptically polarized light has one or more predetermined polarization ellipse parameters, the one or more predetermined ellipse parameters comprise at least one of an ellipticity or an orientation angle,
wherein the elliptically polarized light is represented by an ellipse having a semi-major axis of length a, and a semi-minor axis of length b, where a and b correspond to amplitudes of two orthogonal components of the elliptically polarized light, respectively,
the ellipticity of the elliptically polarized light is defined as $\varepsilon = b/a$, and
the orientation angle of the elliptically polarized light is an angle of the semi-major axis measured counter-clockwise from an alignment direction of the birefringent material in the second optical element.

11. The optical lens assembly of claim 10, wherein the ellipticity of the elliptically polarized light is in a range of about $-1 < \varepsilon \leq -0.85$ when the chirality of the birefringent material is left-handed, or about $0.85 \leq \varepsilon < 1$ when the chirality of the birefringent material is right-handed.

12. The optical lens assembly of claim 10, wherein the orientation angle of the elliptically polarized light is in a range of about 75 degrees $\leq \Psi \leq$ 90 degrees.

13. The optical lens assembly of claim 7, wherein the reflective polarizer includes a stack of a plurality of layers of birefringent materials, and each layer has a respective constant helix pitch.

14. The optical lens assembly of claim 7, wherein the reflective polarizer includes a stack of a plurality of layers of birefringent materials, and each layer has a respective gradient helix pitch along an axial direction of the respective layer.

15. The optical lens assembly of claim 7, wherein the reflective polarizer includes a stack of a plurality of layers of birefringent materials, and the stack includes at least one of a layer having a constant helix pitch, or a layer having a gradient helix pitch.

16. The optical lens assembly of claim 15, wherein the reflective polarizer includes a plurality of positive C-plates disposed between the layers of birefringent materials.

17. The optical lens assembly of claim 7, wherein
the optical waveplate is a quarter-wave plate, and
a polarization axis of the quarter-wave plate is oriented relative to a polarization direction of the incident light to convert the incident light into the elliptically polarized light having the one or more predetermined polarization ellipse parameters.

* * * * *